(12) United States Patent
Li

(10) Patent No.: US 12,383,890 B2
(45) Date of Patent: Aug. 12, 2025

(54) MIXED ZEOLITE-CONTAINING SCR CATALYST

(71) Applicant: BASF MOBILE EMISSIONS CATALYSTS LLC, Iselin, NJ (US)

(72) Inventor: Yuejin Li, Iselin, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 398 days.

(21) Appl. No.: 15/733,739

(22) PCT Filed: Apr. 10, 2019

(86) PCT No.: PCT/IB2019/052968
§ 371 (c)(1),
(2) Date: Oct. 9, 2020

(87) PCT Pub. No.: WO2019/198014
PCT Pub. Date: Oct. 17, 2019

(65) Prior Publication Data
US 2021/0114007 A1 Apr. 22, 2021

Related U.S. Application Data

(60) Provisional application No. 62/656,008, filed on Apr. 11, 2018.

(51) Int. Cl.
*B01J 29/80* (2006.01)
*B01J 29/85* (2006.01)
*B01J 37/04* (2006.01)
*B01J 37/08* (2006.01)
*F01N 3/20* (2006.01)
*B01J 29/072* (2006.01)
*B01J 29/76* (2006.01)

(52) U.S. Cl.
CPC ............... *B01J 29/80* (2013.01); *B01J 29/85* (2013.01); *B01J 37/04* (2013.01); *B01J 37/08* (2013.01); *F01N 3/2066* (2013.01); *B01J 29/072* (2013.01); *B01J 29/76* (2013.01); *F01N 2250/12* (2013.01)

(58) Field of Classification Search
CPC ... B01J 29/50; B01J 29/56; B01J 29/40; B01J 29/46; B01J 29/80; B01J 29/85; B01J 29/83; B01J 29/86; B01J 29/87; B01J 29/24; B01J 29/7015; B01J 29/763; B01J 29/65; B01J 29/7007; B01J 29/14; B01J 29/061; B01J 29/084; B01J 29/18; B01J 29/072; B01J 29/76; B01J 29/68; B01J 2029/062; B01J 2229/186; B01J 35/023; B01J 35/04; B01J 37/04; B01J 37/08; B01J 37/0215; B01J 37/0244; B01J 37/0246; B01J 37/0248; Y02T 10/12; F01N 3/2066; F01N 3/2828; F01N 2510/063; F01N 2510/0684; F01N 2510/0682; F01N 2250/12; F01N 2330/06; B01D 53/9418; B01D 2255/20761; B01D 2255/50; B01D 2255/911; B01D 2255/915; B01D 2255/9155; B01D 2251/2062
USPC ........ 502/63, 64, 66, 67, 69, 71, 74, 77, 78, 502/79; 422/177, 180; 423/235, 239.1, 423/239.2
See application file for complete search history.

(56) References Cited

U.S. PATENT DOCUMENTS

| | | | | |
|---|---|---|---|---|
| 5,024,981 | A * | 6/1991 | Speronello | B01J 29/24 502/67 |
| 5,516,497 | A * | 5/1996 | Speronello | B01J 29/7615 423/239.2 |
| 8,535,629 | B2 | 9/2013 | Ballinger et al. | |
| 8,987,162 | B2 * | 3/2015 | Narula | C01B 39/46 502/64 |
| 10,105,691 | B2 * | 10/2018 | Lupescu | B01J 29/7615 |
| 10,857,521 | B2 | 12/2020 | Sung et al. | |
| 2011/0305614 | A1 * | 12/2011 | Stiebels | B01J 37/0246 60/299 |
| 2012/0186229 | A1 | 7/2012 | Phillips et al. | |

(Continued)

FOREIGN PATENT DOCUMENTS

| CN | 104080532 A | 10/2014 |
|---|---|---|
| CN | 107405606 A | 11/2017 |

(Continued)

OTHER PUBLICATIONS

International Search Report dated Aug. 13, 2019 for International Application No. PCT/IB2019/052968.
Written Opinion of the International Searching Authority dated Aug. 13, 2019 for International Application No. PCT/IB2019/052968.
European Search Report dated Nov. 25, 2021 for European Application No. 19784445.9, 8 pages.
First Office Action dated Dec. 23, 2023, of counterpart Chinese Patent Application No. 201980024904.9, along with an English machine translation.

(Continued)

*Primary Examiner* — Smita S Patel
(74) *Attorney, Agent, or Firm* — DLA Piper LLP (US)

(57) ABSTRACT

The present disclosure generally provides selective catalytic reduction (SCR) catalyst compositions, catalyst articles and catalyst systems including such catalyst articles for treating engine exhaust gas. In particular, the SCR catalyst composition includes a first zeolite and a second zeolite and has not been subjected to temperatures above 650° C. The first zeolite includes a promoter metal and has a first framework structure and at least a portion of the second zeolite is in a form selected from $H^+$ form, $NH_4^+$ form, alkali metal form, alkaline earth metal form, and combinations thereof and has a second framework structure. The first framework structure and the second framework structure are different.

13 Claims, 11 Drawing Sheets

(56) References Cited

U.S. PATENT DOCUMENTS

| | | | | |
|---|---|---|---|---|
| 2012/0275977 A1* | 11/2012 | Chandler | ............... | B01J 35/04 |
| | | | | 60/299 |
| 2012/0301381 A1* | 11/2012 | Fedeyko | ............... | B01J 29/005 |
| | | | | 502/67 |
| 2013/0089483 A1* | 4/2013 | Stiebels | ............... | B01J 29/04 |
| | | | | 423/239.2 |
| 2015/0064088 A1* | 3/2015 | Green | ............... | B01D 53/8628 |
| | | | | 502/67 |
| 2015/0098870 A1 | 4/2015 | Lambert et al. | | |
| 2015/0367336 A1 | 12/2015 | Trukhan et al. | | |
| 2017/0282166 A1 | 10/2017 | Lupescu et al. | | |
| 2018/0045097 A1* | 2/2018 | Tang | ............... | B01J 29/76 |
| 2018/0093259 A1 | 4/2018 | Chen et al. | | |

FOREIGN PATENT DOCUMENTS

| | | | |
|---|---|---|---|
| JP | 2015-205243 A | | 11/2015 |
| KR | 10-2016-0048192 | | 5/2016 |
| WO | 2011125050 A1 | | 10/2011 |
| WO | 2013050964 A1 | | 4/2013 |
| WO | WO 2013/050964 | * | 4/2013 |
| WO | 2018178643 A1 | | 10/2018 |

OTHER PUBLICATIONS

Notice of Reasons for Refusal dated Feb. 14, 2023, of counterpart Japanese Patent Application No. 2020-555786, along with an English translation.

Notice of Second Office Action dated Jul. 7, 2023, of counterpart Chinese Patent Application No. 201980024904.9, along with an English machine translation.

Notice of Reasons for Refusal dated Jun. 13, 2023, of counterpart Japanese Patent Application No. 2020-555786, along with an English translation.

Third Office Action dated Nov. 13, 2023, of counterpart Chinese Patent Application No. 201980024904.9, along with an English translation.

Notice of Reasons for Refusal dated Nov. 21, 2023, of counterpart Japanese Patent Application No. 2020-555786, along with an English machine translation.

Notice of Preliminary Rejection dated Feb. 15, 2024, from corresponding Korean Patent Appln. No. 10-2020-7028933, and a machine generated translation.

* cited by examiner

MIXED ZEOLITE-CONTAINING SCR CATALYST

This application is a national stage application filed under 35 U.S.C. § 371 of International Patent Application No. PCT/IB2019/052968, filed on Apr. 10, 2019, which claims the benefit under 35 U.S.C. § 119(e) to U.S. Provisional Application No. 62/656,008, filed Apr. 11, 2018; each of which is incorporated herein by reference in its entirety.

FIELD OF THE INVENTION

The present disclosure relates generally to the field of selective catalytic reduction catalysts and to methods of preparing and using such catalysts to selectively reduce nitrogen oxides.

BACKGROUND OF THE INVENTION

Over time, the harmful components of nitrogen oxides ($NO_x$) have led to atmospheric pollution. $NO_x$ is contained in exhaust gases, such as from internal combustion engines (e.g., in automobiles and trucks), from combustion installations (e.g., power stations heated by natural gas, oil, or coal), and from nitric acid production plants.

Various treatment methods have been used for the treatment of $NO_x$-containing gas mixtures to decrease atmospheric pollution. One type of treatment involves catalytic reduction of nitrogen oxides. There are two processes: (1) a nonselective reduction process wherein carbon monoxide, hydrogen, or a hydrocarbon is used as a reducing agent; and (2) a selective reduction process wherein ammonia or an ammonia precursor is used as a reducing agent. In the selective reduction process, a high degree of nitrogen oxide removal can be achieved with a small amount of reducing agent.

The selective reduction process is referred to as a SCR (selective catalytic reduction) process. The SCR process selectively reduces nitrogen oxides with a reductant (e.g., ammonia) in the presence of a high level of oxygen, resulting in the formation predominantly of nitrogen and water:

  (standard SCR reaction)

  (slow SCR reaction)

  (fast SCR reaction)

Catalysts employed in the SCR process ideally should be able to retain good catalytic activity over a wide range of temperature, for example, 200° C. to 600° C. or higher, under hydrothermal conditions. SCR catalysts are commonly exposed to high temperature, hydrothermal conditions, such as during the regeneration of a soot filter, a component of the exhaust gas treatment system used for the removal of particles.

Molecular sieves such as zeolites have been used in the SCR of nitrogen oxides with a reductant such as ammonia, urea, or a hydrocarbon in the presence of oxygen. Zeolites are crystalline materials having rather uniform pore sizes, which depending upon the type of zeolite and the type and amount of cations included in the zeolite, range from about 3 to about 10 Angstroms in diameter. Zeolites having 8 member-ring pore openings and double-six ring secondary building units, particularly those having cage-like structures, have recently been studied for use as SCR catalysts. A specific type of zeolite having these properties is chabazite (CHA), which is a small pore zeolite with 8 member-ring pore openings (~3.8 Angstroms) accessible through its 3-dimensional porosity. A cage-like structure results from the connection of double six-ring building units by 4 rings.

Metal-promoted zeolite catalysts, also often referred to as ion-exchanged zeolite catalysts (e.g., iron-promoted and copper-promoted zeolite catalysts) for the selective catalytic reduction of nitrogen oxides with ammonia are known. Unfortunately, it has been found that under harsh hydrothermal conditions (e.g., as exhibited during the regeneration of a soot filter with temperatures locally exceeding 700° C.), the activity of many metal-promoted zeolites begins to decline. This decline has been attributed to dealumination of the zeolite and the consequent loss of metal-containing active centers within the zeolite.

Metal-promoted, particularly copper-promoted, aluminosilicate zeolites having the CHA structure type have solicited a high degree of interest as catalysts for the SCR of oxides of nitrogen in lean burning engines using nitrogenous reductants. These materials exhibit activity within a wide temperature window and excellent hydrothermal durability, as described in U.S. Pat. No. 7,601,662 to Bull et al. However, this patent makes no mention of ammonia storage capacity of the disclosed SCR catalysts at various temperatures. In general, every SCR catalyst is able to store ammonia at low temperatures, which is often introduced into the engine exhaust gas stream to promote $NO_x$ conversion of the SCR catalyst. When the amount of ammonia within the SCR catalyst exceeds the maximum ammonia storage capacity of that particular SCR catalyst, any excess ammonia not consumed passes through the SCR catalyst and exits into the atmosphere. This excess is referred to as ammonia slip. Thus, the ammonia storage capacity is an important property of any SCR catalyst.

Therefore, it would be highly desirable to develop SCR catalysts that exhibit catalytic efficiency at high and low operating temperatures as well as high ammonia storage capacity at such operating temperatures.

SUMMARY OF THE INVENTION

The present disclosure generally provides catalyst compositions, catalytic articles and catalyst systems comprising such catalytic articles, as well as methods of making and using the same. In particular, the disclosed catalyst compositions, as well as articles including such compositions are suitable for selective catalytic reduction (SCR), providing $NO_x$ conversion at low temperatures (e.g., around 200° C.) and at high temperatures (e.g., around 600° C.) while maintaining ample ammonia storage capacity. The SCR catalyst composition described herein comprises two zeolites with different framework structures, wherein at least one of the two zeolites contains a promoter metal (e.g., copper). The SCR catalyst composition can be disposed, for example, on a flow-through substrate to provide a SCR catalyst or can be disposed on a filter to provide a SCR catalyzed soot filter (SCRoF).

One aspect of the disclosure relates to a fresh catalyst composition comprising a first zeolite and a second zeolite, wherein the first zeolite comprises a promoter metal and has a first framework structure, wherein at least a portion of the second zeolite is in a form selected from $H^+$ form, $NH_4^+$ form, alkali metal form, alkaline earth metal form, and combinations thereof and has a second framework structure, wherein the first and second framework structures are different, and wherein the catalyst composition has not been subjected to temperatures above 650° C.

Another aspect of the disclosure relates to a catalyst composition prepared by a process including: mixing a first zeolite with a second zeolite to obtain a blend, wherein the first zeolite includes a promoter metal and has a first framework structure, wherein the second zeolite is in a form selected from H$^+$ form, NH$_4^+$ form, alkali metal form, alkaline earth metal form, and combinations thereof and has a second framework structure, and wherein the first and second framework structures are different, and aging or calcining the blend at a temperature of at least about 650° C. to obtain the catalyst composition. In some embodiments, the second zeolite is in the H$^+$ form. In some embodiments, the second zeolite is substantially free of transition metal.

Another aspect of the disclosure relates to catalyst composition including a first zeolite with a first framework structure and a second zeolite with a second framework structure, wherein the first zeolite includes a promoter metal with a first promoter metal content and the second zeolite includes the promoter metal with a second promoter metal content, wherein the first promoter metal content is higher than the second promoter metal content, and wherein the first and second framework structures are different. In some embodiments, the promoter metal is selected from Cu, Co, Ni, La, Mn, Fe, V, Ag, Ce, Nd, Mo, Hf, Y, W, and combinations thereof. In some embodiments, the promoter metal is copper (Cu) and the second promoter metal content is about 0.1 wt. % to about 25 wt. % of the total Cu content in the catalyst composition, calculated as metal oxide. In some embodiments, the promoter metal is iron (Fe) and the second zeolite comprises Fe in an amount of from about 0.01% to about 10% by weight, calculated as metal oxide. In some embodiments, the second zeolite is present in an amount of from about 0.1% to about 50% by weight based on total weight of the catalyst composition. In some embodiments, the second zeolite is present in an amount of from about 5% to about 20% by weight based on total weight of the catalyst composition. In some embodiments, the first and second zeolites are independently selected from aluminosilicate, borosilicate, gallosilicate, SAPO, AlPO, MeAPSO, and MeAPO zeolites. In some embodiments, the first zeolite is an aluminosilicate. In some embodiments, the first and second framework structures are independently selected from ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AVL, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EEI, EMT, EON, EPI, ERI, ESV, ETR, EUO, FAU, FER, FRA, GIS, GIU, GME, GON, GOO, HEU, IFR, IFY, IHW, IRN, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWF, MWW, NAB, NAT, NES, NON, NPO, NPT, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SFW, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof. In some embodiments, the first and second framework structures are independently selected from AEI, AFT, AFV, AFX, AVL, BEA, CHA, DDR, EAB, EEI, ERI, FAU, FER, IFY, IRN, KFI, LEV, LTA, LTN, MER, MOR, MWF, MFI, NPT, PAU, RHO, RIE, RTH, SAS, SAT, SAV, SFW, TSC, and UFI. In some embodiments, the first framework structure is CHA or AEI. In some embodiments, the second framework structure is selected from FAU, MOR, MFI, BEA, and FER.

Another aspect of the invention relates to a catalytic article comprising a substrate having a plurality of channels for gas flow and the disclosed catalyst composition disposed thereon. In some embodiments, the substrate is a wall flow filter or a flow through substrate. In some embodiments, the catalyst composition has a loading on the substrate of at least about 0.1 g/in$^3$.

Another aspect of the invention relates to a method for reducing NO$_x$ level in an exhaust gas, comprising contacting the exhaust gas with the disclosed catalytic article for a time and at a temperature sufficient to reduce the level of NO$_x$ in the exhaust gas. In some embodiments, the level of NO$_x$ in the exhaust gas is reduced by at least 40%. In some embodiments, the temperature ranges from about 150° C. to about 350° C. In some embodiments, the temperature ranges from about 450° C. to about 750° C.

Another aspect of the invention relates to an emission treatment system for treating an exhaust gas stream, the emission treatment system comprising an engine producing an exhaust gas stream, and the disclosed catalytic article positioned downstream from the engine in fluid communication with the exhaust gas stream. In some embodiments, the emission treatment system further comprises one or more of a diesel oxidation catalyst (DOC), a catalyzed soot filter (CSF), a soot filter, a selective catalytic reduction (SCR) catalyst, a SCR catalyst coated onto a filter (SCRoF), an ammonia oxidation (AMOx) catalyst, a SCR/AMOx catalyst, a lean NO$_x$ trap (LNT), and a nitrogenous reductant injector. In some embodiments, the disclosed emission treatment system comprises: (a) the catalyst composition located downstream of the DOC and upstream of the soot filter; or (b) the catalyst composition located downstream of the DOC and the soot filter; or (c) the catalyst composition located upstream of the DOC and the soot filter; or (d) the catalyst composition is located downstream of the LNT; or (e) the catalyst composition is on the soot filter; or (f) the catalyst composition is on the SCR catalyst or the SCR/AMOx catalyst.

Another aspect of the disclosure relates to a method of making a catalyst composition comprising mixing a first zeolite with a second zeolite to obtain a blend, wherein the first zeolite comprises a promoter metal and has a first framework structure, wherein the second zeolite is in a form selected from H$^+$ form, NH$_4^+$ form, alkali metal form, alkaline earth metal form, and combinations thereof and has a second framework structure, and wherein the first and second framework structures are different, and aging or calcining the blend at a temperature of at least about 650° C. to obtain the catalyst composition. In some embodiments, the second zeolite is substantially free of transition metal.

The present disclosure includes, without limitation, the following embodiments:

Embodiment 1: A fresh catalyst composition comprising: a first zeolite and a second zeolite, wherein the first zeolite comprises a promoter metal and has a first framework structure; wherein at least a portion of the second zeolite is in a form selected from H$^+$ form, NH$_4^+$ form, alkali metal form, alkaline earth metal form, and combinations thereof and has a second framework structure; wherein the first and second framework structures are different; and wherein the catalyst composition has not been subjected to temperatures above 650° C.

Embodiment 2: A catalyst composition prepared by a process comprising: mixing a first zeolite with a second zeolite to obtain a blend, wherein the first zeolite comprises a promoter metal and has a first framework structure, wherein the second zeolite is in a form selected from H+ form, $NH_4^+$ form, alkali metal form, alkaline earth metal form, and combinations thereof and has a second framework structure, and wherein the first and second framework structures are different; and aging or calcining the blend at a temperature of at least about 650° C. to obtain the catalyst composition.

Embodiment 3: The catalyst composition of any preceding embodiment, wherein the second zeolite is in the H+ form.

Embodiment 4: The catalyst composition of any preceding embodiment, wherein the second zeolite is substantially free of transition metal.

Embodiment 5: A catalyst composition comprising: a first zeolite with a first framework structure and a second zeolite with a second framework structure, wherein the first zeolite comprises a promoter metal with a first promoter metal content and the second zeolite comprises the promoter metal with a second promoter metal content; wherein the first promoter metal content is higher than the second promoter metal content; and wherein the first and second framework structures are different.

Embodiment 6: The catalyst composition of any preceding embodiment, wherein the promoter metal is selected from Cu, Co, Ni, La, Mn, Fe, V, Ag, Ce, Nd, Mo, Hf, Y, W, and combinations thereof.

Embodiment 7: The catalyst composition of any preceding embodiment, wherein the promoter metal is copper (Cu) and the second promoter metal content is about 0.1 wt. % to about 25 wt. % of the total Cu content in the catalyst composition, calculated as metal oxide.

Embodiment 8: The catalyst composition of Embodiment 5 or 6, wherein the promoter metal is iron (Fe) and the second zeolite comprises Fe in an amount of from about 0.01% to about 10% by weight, calculated as metal oxide.

Embodiment 9: The catalyst composition of any preceding embodiment, wherein the second zeolite is present in an amount of from about 0.1% to about 50% by weight based on total weight of the catalyst composition.

Embodiment 10: The catalyst composition of any preceding embodiment, wherein the second zeolite is present in an amount of from about 5% to about 20% by weight based on total weight of the catalyst composition.

Embodiment 11: The catalyst composition of any preceding embodiment, wherein the first and second zeolites are independently selected from aluminosilicate, borosilicate, gallosilicate, SAPO, AlPO, MeAPSO, and MeAPO zeolites.

Embodiment 12: The catalyst composition of any preceding embodiment, wherein the first zeolite is an aluminosilicate.

Embodiment 13: The catalyst composition of any preceding embodiment, wherein the first and second framework structures are independently selected from AEI, AFT, AFV, AFX, AVL, BEA, CHA, DDR, EAB, EEI, ERI, FAU, FER, IFY, IRN, KFI, LEV, LTA, LTN, MER, MOR, MWF, MFI, NPT, PAU, RHO, RTE, RTH, SAS, SAT, SAV, SFW, TSC, and UFI.

Embodiment 14: The catalyst composition of any preceding embodiment, wherein the first framework structure is CHA or AEI.

Embodiment 15: The catalyst composition of any preceding embodiment, wherein the second framework structure is selected from FAU, MOR, MFI, BEA, and FER.

Embodiment 16: A catalytic article comprising a substrate having a plurality of channels for gas flow and the catalyst composition of any preceding embodiment disposed thereon.

Embodiment 17: The catalytic article of the preceding embodiment, wherein the substrate is a wall flow filter or a flow through substrate.

Embodiment 18: The catalytic article of any preceding embodiment, wherein the catalyst composition has a loading on the substrate of at least about 0.1 $g/in^3$.

Embodiment 19: A method for reducing $NO_x$ level in an exhaust gas, comprising contacting the exhaust gas with the catalytic article of any of the preceding embodiments, for a time and at a temperature sufficient to reduce the level of $NO_x$ in the exhaust gas.

Embodiment 20: The method of the preceding embodiment, wherein the level of $NO_x$ in the exhaust gas is reduced by at least 40%.

Embodiment 21: The method of any preceding embodiment, wherein the temperature ranges from about 150° C. to about 350° C.

Embodiment 22: The method of any preceding embodiment, wherein the temperature ranges from about 450° C. to about 750° C.

Embodiment 23: An emission treatment system for treating an exhaust gas stream, the emission treatment system comprising: an engine producing an exhaust gas stream; and the catalytic article of any preceding embodiment positioned downstream from the engine in fluid communication with the exhaust gas stream.

Embodiment 24: The emission treatment system of the preceding embodiment, further comprising one or more of a diesel oxidation catalyst (DOC), a catalyzed soot filter (CSF), a soot filter, a selective catalytic reduction (SCR) catalyst, a SCR catalyst coated onto a filter (SCRoF), an ammonia oxidation (AMOx) catalyst, a SCR/AMOx catalyst, a lean $NO_x$ trap (LNT), and a nitrogenous reductant injector.

Embodiment 25: The emission treatment system of any preceding embodiment, wherein: the catalyst composition is located downstream of the DOC and upstream of the soot filter; or the catalyst composition is located downstream of the DOC and the soot filter; or the catalyst composition is located upstream of the DOC and the soot filter; or the catalyst composition is located downstream of the LNT; or the catalyst composition is on the soot filter; or the catalyst composition is on the SCR catalyst or the SCR/AMOx catalyst.

Embodiment 26: A method of making the catalyst composition of any of Embodiments 1-15, comprising: mixing a first zeolite with a second zeolite to obtain a blend, wherein the first zeolite comprises a promoter metal and has a first framework structure, wherein the second zeolite is in a form selected from H+ form, $NH_4^+$ form, alkali metal form, alkaline earth metal form, and combinations thereof and has a second framework structure, and wherein the first and second framework structures are different; and aging or calcining the blend at a temperature of at least about 650° C. to obtain the catalyst composition.

Embodiment 27: A method of making a catalyst composition, comprising: mixing a first zeolite with a second zeolite to obtain a blend, wherein the first zeolite comprises a promoter metal and has a first framework structure, wherein the second zeolite is in a form selected from form, $NH_4^+$ form, alkali metal form, alkaline earth metal form, and combinations thereof and has a second framework structure, and wherein the first and second framework structures are different; and aging or calcining the blend at a temperature of at least about 650° C. to obtain the catalyst composition.

Embodiment 28: The method of Embodiment 26 or 27, wherein the second zeolite is substantially free of transition metal.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the current disclosure, reference is made to the appended drawings, which are not necessarily drawn to scale, and in which reference numerals refer to components of exemplary embodiments of the disclosure. The drawings are exemplary only, and should not be construed as limiting the disclosure.

DETAILED DESCRIPTION

Figure 1:
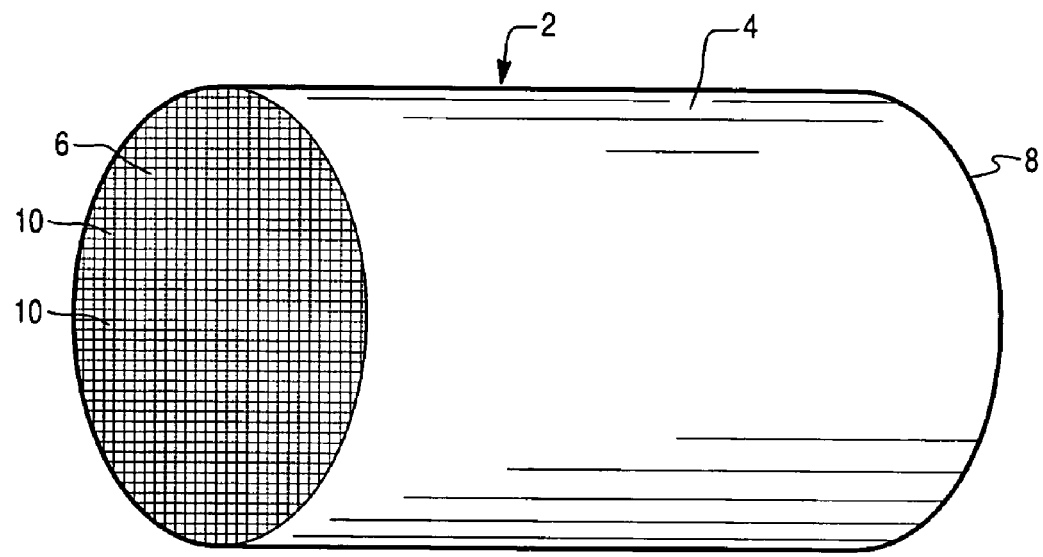
FIG. 1 is a perspective view of a honeycomb-type substrate which may comprise a catalyst composition (i.e., SCR catalyst washcoat composition) in accordance with the present disclosure.

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure generally provides catalyst compositions, catalytic articles, and catalyst systems comprising such catalytic articles, and methods of making and using such catalyst compositions, catalytic articles and systems. The disclosed compositions are particularly suitable for selective catalytic reduction (SCR) of nitrogen oxides ($NO_x$) and are capable of maintaining sufficient ammonia storage capacity over a range of operating temperatures. The SCR catalyst compositions provided herein comprise two zeolites with different framework structures, wherein at least one of the two zeolites contains a promoter metal (e.g., copper). In particular, such catalyst compositions can be prepared by mixing a first zeolite with a second zeolite and hydrothermally aging the mixture. The first zeolite of the mixture comprises a promoter metal (e.g., copper), which is introduced into the zeolite, e.g., via a conventional ion-exchange process. The second zeolite in the mixture is provided with no promoter metal intentionally added thereto. Without intending to be bound by theory, it is thought that during high temperature treatment (e.g., as typically associated with aging processes and certain high temperature calcination processes) of the resulting composition, at least a portion of the promoter metal originally associated with the first zeolite becomes associated with the second zeolite. Thus, in some embodiments, the promoter metal which was initially associated with only the first zeolite in the mixture is distributed between the first and second zeolites after such high temperature treatment. The distribution of the promoter metal between the two zeolite types after exposure to high temperature can vary. In some embodiments, the first zeolite may comprise a greater amount of promoter metal than the second zeolite after exposure to high temperature. For example, in some embodiments, the second zeolite may contain up to 25 wt. % of the total promoter metal content (i.e., CuO) in the catalyst composition, calculated as metal oxide, after such exposure. In some embodiments, the second zeolite may comprise a greater amount of promoter metal than the first zeolite after high temperature exposure.

Surprisingly, in some embodiments, the disclosed SCR catalyst composition exhibits higher $NO_x$ conversion after high temperature exposure than a SCR catalyst composition having metal-promoted zeolites with a single framework structure (e.g., a comparative composition comprising only the first zeolite or second zeolite, in metal-promoted form). Certain zeolites, in fact, are known to not effectively endure typical high temperature exposure, e.g., aging conditions (e.g., do not maintain their structural integrity and/or catalytic activity after exposure to such conditions). Thus, it is unexpected that catalyst compositions comprising such zeolites in some embodiments exhibit enhanced $NO_x$ conversion properties in comparison to corresponding compositions containing only zeolite framework structures considered to be stable under such conditions. For example, in some embodiments, a composition containing a first zeolite with a CHA framework in combination with a second zeolite having a framework typically understood to be unstable under hydrothermal aging conditions, as disclosed herein, surprisingly exhibits higher $NO_x$ conversion than a comparative composition containing only zeolites with a CHA framework after high temperature exposure.

The SCR catalyst composition disclosed herein also exhibits higher ammonia storage capacity after high temperature exposure than a SCR catalyst composition having metal-promoted zeolites with a single framework structure (e.g., a comparative composition comprising only the first zeolite or second zeolite, in metal-promoted form). The ammonia storage capacity of the disclosed SCR catalyst composition is linearly proportional to its $NO_x$ conversion at low reaction temperatures, for example 200° C., after high temperature exposure. Thus, the disclosed SCR catalyst composition exhibiting high $NO_x$ conversion also exhibits high ammonia storage capacity compared to corresponding compositions containing only zeolite framework structures understood to be stable after aging (e.g., including, but not limited to, CHA frameworks). For example, in some embodiments, the disclosed compositions, e.g., a composition containing a first zeolite with a CHA framework in combination with a second zeolite having a framework typically understood to be unstable under hydrothermal aging conditions, surprisingly exhibit higher ammonia storage capacity than a comparative composition containing only zeolites with a CHA framework after high temperature exposure. Such catalyst compositions, articles, systems, and methods of making and using the same will be described more fully herein below.

As used herein, the term "selective catalytic reduction" (SCR) refers to the catalytic process of reducing oxides of nitrogen to dinitrogen ($N_2$) using a nitrogenous reductant (e.g., ammonia, urea, and the like).

As used herein, the term "catalyst" or "catalyst composition" refers to a material that promotes a reaction.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products ($CO_2$ and $H_2O$), products of incomplete combustion (CO and hydrocarbons), oxides of nitrogen (NO and $NO_2$), combustible and/or carbonaceous particulate matter (soot), and un-reacted oxygen ($O_2$) and nitrogen ($N_2$).

As used herein, the term "substrate" refers to the monolithic material onto which the catalyst composition is placed, typically in the form of a washcoat containing a plurality of particles containing a catalytic composition thereon. A washcoat is formed by preparing a slurry containing a certain solid content (e.g., 10-50% by weight) of particles in a liquid vehicle, which is then coated onto a substrate and dried to provide a washcoat layer.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

As used herein, the term "catalytic article" refers to an element that is used to promote a desired reaction. For example, a catalytic article may comprise a washcoat containing catalytic compositions on a substrate. The catalytic article may be "fresh", meaning it is new and has not been exposed to any excessive heat (e.g., >500° C.) or thermal stress for a prolonged period of time. "Fresh" may also mean that the catalyst was recently prepared and has not been exposed to any exhaust gases. Likewise, an "aged" catalytic article is not new and has been exposed to exhaust gases and elevated temperature (i.e. greater than 500° C.) for a prolonged period of time (i.e., greater than 2 hours).

The term "abate" means to decrease in amount and "abatement" means a decrease in the amount, caused by any means.

The term "promoter metal" refers to one or more metals added to a molecular sieve, e.g., zeolite using ion exchange processes; that is, the promoter metal is exchanged with, for example, a hydrogen or ammonium or sodium ion located within the pores of the molecular sieve. The promoter metal is added to the molecular sieve to enhance the catalytic activity of the molecular sieve compared to molecular sieves that do not contain the promoter metal. The promoter metal actively participates in the promotion of a chemical reaction, e.g., copper participates in the conversion of nitrogen oxides, and is therefore often referred to as the active metal. A promoter metal can be exchanged into the zeolite by a liquid phase exchange process, where the soluble metal ions exchange with the proton or ammonium or sodium ions associated with the zeolite. The exchange can also be carried out by a solid-state process, where promoter metal oxide or metal salt solid particles are mixed with a zeolite powder and processed under certain temperature and gas environments that may or may not contain steam. The exchange process can also be accomplished via an in-situ process during slurry preparation, where fine metal oxide particles are suspended in a zeolite slurry under conditions suitable for solid-liquid interaction.

Catalyst Composition

The catalyst composition disclosed herein generally comprises molecular sieves and, in particular, comprises two or more molecular sieves with different framework structures. The term "molecular sieve" generally refers to framework materials such as zeolites and other framework materials (e.g., isomorphously substituted materials). Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. According to one or more embodiments, it will be appreciated that by defining the molecular sieves by their framework type, it is intended to include any and all zeolite or isotypic framework materials, such as SAPO, AlPO and MeAPO, Ge-silicates, all-silica, and similar materials having the same framework type.

Generally, molecular sieves are defined as aluminosilicates with open 3-dimensional framework structures composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules are removable.

In more specific embodiments, reference to an aluminosilicate zeolite framework type limits the material to molecular sieves that do not include phosphorus or other metals substituted in the framework. However, to be clear, as used herein, "aluminosilicate" excludes aluminophosphate materials such as SAPO, AlPO, MeAPSO, and MeAPO materials, and the broader term "zeolite" is intended to include aluminosilicates and aluminophosphates. The term "aluminophosphates" refers to another specific example of a molecular sieve, including aluminum and phosphate atoms.

In one or more embodiments, the molecular sieves are selected from aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235, LZ-236, ZK-14, SAPO-34, SAPO-44, SAPO-47, ZYT-6, CuSAPO-34, CuSAPO-44, Ti-SAPO-34, and CuSAPO-47.

In one or more embodiments, the molecular sieves referred to herein comprise $SiO_4/AlO_4$ tetrahedra that are linked by common oxygen atoms to form a three-dimensional network. In other embodiments, the molecular sieves comprise $SiO_4/AlO_4/PO_4$ tetrahedra. Molecular sieves can be differentiated mainly according to the geometry of the voids which are formed by the rigid network of the $SiO_4/AlO_4$ or $SiO_4/AlO_4/PO_4$, tetrahedra. The entrances to the voids are formed from 6, 8, 10, or 12 ring atoms with respect to the atoms which form the entrance opening. In one or more embodiments, the molecular sieves comprise ring sizes of no larger than 12, including 6, 8, 10, and 12.

In one or more embodiments, the molecular sieve comprises an 8-ring small pore aluminosilicate zeolite. As used herein, the term "small pore" refers to pore openings which are smaller than about 5 Angstroms, for example on the order of ~3.8 Angstroms. For example, the CHA structure is an "8-ring" zeolite having 8-ring pore openings and double-six ring secondary building units and having a cage like structure resulting from the connection of double six-ring building units by 4 rings. In one or more embodiments, the molecular sieve is a small pore molecular sieve having a maximum ring size of eight tetrahedral atoms.

The catalyst composition disclosed herein comprises two or more zeolites with different framework structures. As used herein, the term "zeolite" refers to a specific example of a molecular sieve, including silicon and aluminum atoms. Zeolites are crystalline materials having rather uniform pore sizes which, depending upon the type of zeolite and the type and amount of cations included in the zeolite lattice, range from about 3 to 10 Angstroms in diameter.

An exemplary embodiment of a catalyst composition according to the present disclosure comprises a first zeolite and a second zeolite, wherein the first zeolite has a first framework structure and the second zeolite has a second framework structure, and wherein the first framework structure and the second framework structure are different. The amount (i.e., weight) of the first zeolite and the second zeolite in the catalyst composition can vary. In some embodiments, the amount of the first zeolite is higher than the amount of the second zeolite. In some embodiments, the amount of the second zeolite is higher than the first zeolite. In some embodiments, the amount of the first zeolite is the same as the amount of the second zeolite. In some embodiments, the first zeolite and the second zeolite are present in amounts such that the weight ratio of the first zeolite:second zeolite ranges from about 1:10 to about 20:1, from about 1:1 to about 20:1, from about 1:1 to about 19:1, from about 1:1 to about 18:1, from about 1:1 to about 17:1, from about 1:1 to about 16:1, from about 1:1 to about 15:1, from about 1:1 to about 14:1, from about 1:1 to about 13:1, from about 1:1 to about 12:1, from about 1:1 to about 11:1, from about 1:1 to about 10:1, from about 1:1 to about 9:1, from about 1:1 to about 8:1, from about 1:1 to about 7:1, from about 1:1 to about 6:1, from about 1:1 to about 5:1, from about 1:1 to about 4:1, from about 1:1 to about 3:1, or from about 1:1 to about 2:1.

Aluminosilicate zeolites typically comprise framework structures including silica (Si) and alumina (Al), wherein the molar silica-to-alumina ratio (SAR) within the framework can vary over a wide range, but is generally 2 or greater. In some embodiments, the first zeolite and the second zeolite independently have a SAR in the range of about 2 to about 300, including about 5 to about 250, about 5 to about 200, about 5 to about 100, and about 5 to about 50. In some embodiments, the first zeolite and the second zeolite independently have a SAR in the range of about 10 to about 200, about 10 to about 100, about 10 to about 75, about 10 to about 60, and about 10 to about 50, about 15 to about 100, about 15 to about 75, about 15 to about 60, and about 15 to about 50, about 20 to about 100, about 20 to about 75, about 20 to about 60, and about 20 to about 50. In some embodiments, the SAR of the first zeolite and the SAR of the second zeolite are the same. In some embodiments, the SAR of the first zeolite and the SAR of the second zeolite are different Zeolites are generally identified by their framework topology. For example, the framework structure types of the first zeolite (i.e., first framework) and the second zeolite (i.e., second framework) can independently be selected from framework types AB W, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AVL, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EEI, EMT, EON, EPI, ERI, ESV, ETR, EUO, FAU, FER, FRA, GIS, GIU, GME, GON, GOO, HEU, IFR, IFY, IHW, IRN, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWF, MWW, NAB, NAT, NES, NON, NPO, NPT, NSI, OBW, OFF, OSI, OSO, OWE, PAR, PAU, PHI, PON, RHO, RON, RRO, RSN, RIE, RTH, RUT, RWR, RWY, SAO, SAS, SAT, SAV, SBE, SBS, SBT, SFE, SFF, SFG, SFH, SFN, SFO, SFW, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof. In some embodiments, the frameworks of the first zeolite and second zeolite are independently selected from AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, and UFI. In some embodiments, the first framework is CHA and the second framework is selected from FAU, MOR, MFI, BEA, and FER.

The disclosed zeolites are generally prepared in the alkali metal form, wherein "alkali metal form" refers to zeolites having alkali metal ions residing within the zeolitic ion-exchange sites. Ion-exchange of zeolites in the alkali metal form with exchangeable cations such as $NH_4^+$, $H^+$, or alkaline earth metal ions, introduces exchangeable ions inside the zeolitic framework structure, changing the form of the zeolite. For example, ion-exchange of zeolites in the alkali metal form with $NH_4^+$ ions affords zeolites in the $NH_4^+$ form. Zeolites prepared for use in the catalyst compositions disclosed herein can be in the $H^+$, $NH_4^+$, alkali metal form, alkaline earth metal form, or combinations thereof. In some embodiments, the catalyst composition disclosed herein comprises at least one zeolite partially or completely in the $H^+$ form.

In certain embodiments, the catalyst composition described herein comprises at least one promoted zeolite. As used herein, "promoted" refers to a zeolite comprising one or more promoter metals that are intentionally added, as opposed to comprising impurities that may be inherent in the zeolite.

In some embodiments, the disclosed zeolites are promoted with a promoter metal selected from the group consisting of alkali metals, alkaline earth metals, transition metals in Groups IIIB, IVB, VB, VIB, VIIB, VIIIB, IB, and IIB, Group IIIA elements, Group IVA elements, lanthanides, actinides, and combinations thereof. In some embodiments, further promoter metals that can be used to prepare promoted zeolites of the disclosed catalyst compositions include, but are not limited to, copper (Cu), cobalt (Co), nickel (Ni), lanthanum (La), manganese (Mn), iron (Fe), vanadium (V), silver (Ag), cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), tungsten (W), and combinations thereof. In some embodiments, the promoter metal of the first zeolite is Cu. As will be detailed herein, the second zeolite herein may also, in some embodiment, include a promoter metal, which is the same as or different than the promoter metal of the first zeolite. The promoter metal content of the at least one metal-promoted zeolite in the disclosed catalyst compositions, calculated as the oxide, in one or more embodiments, independently ranges from about 0.01 wt. % to about 15 wt. %, from about 0.1 wt. % to about 10 wt. %, or from about 0.1 wt. % to about 5 wt. %, based on the total weight of the corresponding calcined zeolite (including the promoter metal) and reported on a volatile-free basis. In some embodiments, the promoter metal is copper or iron.

Copper participates in the conversion of nitrogen oxides and thus may be a particularly useful metal for exchange into zeolites, in some embodiments, as disclosed herein. Accordingly, in particular embodiments, a catalyst composition is provided which comprises a zeolite promoted with copper, e.g., Cu-CHA, e.g., as a first zeolite in the disclosed compositions. However, the disclosure is not intended to be limited thereto, and catalyst compositions comprising other zeolites with other promoter metals are also encompassed herein.

In some embodiments, the first zeolite comprises a promoter metal and the second zeolite is in a form selected from $H^+$ form, $NH_4^+$ form, alkali metal form, alkaline earth metal form, and combinations thereof. In some embodiments, the second zeolite is in the $H^+$ form and in some such embodiments, may be substantially free of metal, e.g., transition metal. In some embodiments, the second zeolite is substantially free of a promoter metal. As used herein, the term "substantially free of transition metal" or "substantially free of promoter metal" means that there is no additional metal, e.g., transition metal or promoter metal, intentionally added to the second zeolite, and, in some embodiments there is less than about 0.01 wt. % of any additional metal, e.g., transition metal or promoter metal, by weight present in the second zeolite when it is incorporated within the catalyst composition (i.e., before aging or calcining). In some embodiments, "substantially free" of transition metal or promoter metal includes "free" of transition metal or promoter metal. Such embodiments are relevant in the context of catalyst compositions that have not been subjected to high temperature treatment/exposure as described in further detail herein, as commonly associated with, e.g., aging and certain calcination processes. As referenced herein, during such high temperature exposure there may be some redistribution of metal (e.g., promoter metal) between the zeolites and, as such, the second zeolite may, in some embodiments, no longer be characterized as "substantially free" of transition or promoter metal after such calcining and/or aging.

As referenced above, the promoter metal is typically not intentionally added to the second zeolite, but is thought to be introduced into the second zeolite at elevated temperatures, e.g., during calcining and/or aging of the catalyst composition. Without intending to be bound by theory, it is thought that upon exposure to such conditions, some of the promoter metal initially associated with the first zeolite migrates (e.g., during a calcining and/or aging process or during use) to the second zeolite. For example, transfer of active Cu sites may occur for catalyst compositions wherein the first zeolite is promoted with copper and the second zeolite is promoter metal free (e.g., in the $H^+$ form). Cu present in the first zeolite (e.g., in the form of concentrated active Cu sites and Cu-clusters) is transferred at least in part to the second zeolite (which is substantially free of promoter metal) under such conditions, thereby reducing the concentration of Cu in the first zeolite and increasing the number of exchanged Cu sites in the entire catalyst composition.

The promoter metal content of each zeolite after exposure to these conditions can vary. In some embodiments, a majority of the promoter metal remains associated with the first zeolite after exposure to the referenced conditions. In other embodiments, exposure to these conditions results in a transfer of more than half of the promoter metal originally associated with the first zeolite to the second zeolite. In some embodiments, the promoter metal content is distributed between the two zeolites to give a final weight ratio of metal associated with the first zeolite to metal associated with the second zeolite of from about 0.1:10 to about 20:0.1, from about 20:1 to about 1:1, from about 19:1 to about 1:1, from about 18:1 to about 1:1, from about 17:1 to about 1:1, from about 16:1 to about 1:1, from about 15:1 to about 1:1, from about 14:1 to about 1:1, from about 13:1 to about 1:1, from about 12:1 to about 1:1, from 11:1 to about 1:1, from 10:1 to about 1:1, from about 9:1 to about 1:1, from about 8:1 to about 1:1, from about 7:1 to about 1:1, from about 6:1 to about 1:1, from about 5:1 to about 1:1, from about 4:1 to about 1:1, from about 3:1 to about 1:1, from about 2:1 to about 1:1, from about 1:2 to about 1:1, from about 1:3 to about 1:1, from about 1:4 to about 1:1, from about 1:5 to about 1:1, from about 1:6 to about 1:1, from about 1:7 to about 1:1, from about 1:8 to about 1:1, from about 1:9 to about 1:1, or from about 1:10 to about 1:1.

In some embodiments, the first promoter metal content is about 0.1 wt. % to about 50 wt. %, about 0.1 wt. % to about 40 wt. %, about 0.1 to about 30 wt. %, about 0.1 to about 20 wt. %, or about 0.1 to about 10 wt. % (or at least 0.1 wt. %, at least 10 wt. %, at least 20 wt. %, at least 30 wt. %, at least 40 wt. % with an upper boundary of 50 wt. %) of the total promoter metal content in the catalyst composition, calculated as metal oxide. In some embodiments, the second promoter metal content is about 0.1 wt. % to about 50 wt. %, about 0.1 wt. % to about 40 wt. %, about 0.1 to about 30 wt. %, about 0.1 to about 20 wt. %, about 0.1 to about 25 wt. %, or about 0.1 to about 10 wt. % (or at least 0.1 wt. %, at least 10 wt. %, at least 20 wt. %, at least 30 wt. %, at least 40 wt. % with an upper boundary of 50 wt. %) of the total promoter metal content in the catalyst composition, calculated as metal oxide. In some embodiments, the promoter metal is copper or iron.

In some embodiments, the catalyst composition described herein provides efficient ammonia storage capacity. SCR catalyst compositions, in general, are able to store ammonia, which is commonly introduced into exhaust gas streams to promote $NO_x$ conversion at suitable operating temperatures. SCR catalyst compositions typically store ammonia at low operating temperatures (e.g., below 250° C.) when the catalytic activity for $NO_x$ conversion is low, and release ammonia at higher operating temperatures (e.g., above 3000° C.) when the catalytic activity for $NO_x$ conversion is high. The amount of ammonia that can be stored within a SCR catalyst composition (i.e., ammonia storage capacity) can vary and is generally dependent upon the zeolite(s) present in the composition and the chemical and structural stability of the zeolite(s) (e.g., after prolonged exposure to high temperatures). SCR catalyst compositions having a high ammonia storage capacity are a result of high concentration of exchanged metal ions in the zeolites and often found to have high $NO_x$ conversion at low temperatures.

The SCR catalyst composition disclosed herein exhibits higher ammonia storage capacity and, thus higher $NO_x$ conversion activity, after high temperature treatment/exposure than a SCR catalyst composition comprising metal-promoted zeolites with a single framework. As referenced above with respect to $NO_x$ conversion activity, it is unexpected that compositions comprising zeolitic frameworks that typically do not withstand high temperatures, e.g., those temperatures associated with hydrothermal aging conditions, exhibit enhanced ammonia storage capacity compared with catalysts with comparable compositions comprising only zeolites understood to be stable at such temperatures.

Substrate

The substrate of the catalytic article of the current disclosure may be constructed of any material typically used for preparing automotive catalysts and will typically comprise a metal or ceramic honeycomb structure. The substrate typically provides a plurality of wall surfaces upon which a washcoat composition comprising a catalyst composition disclosed herein is applied and adhered, thereby acting as a carrier for the one or more catalyst compositions.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface of the metal substrate may be oxidized at high temperatures, e.g., 1000° C. and higher, to form an aluminum oxide layer on the surface of the substrate, improving the corrosion resistance of the alloy and facilitating adhesion of the washcoat layer to the metal surface. Ceramic materials used to construct the substrate may include any suitable refractory material, e.g., cordierite, mullite, cordierite-α alumina, silicon nitride, zircon mullite, spodumene, alumina-silica magnesia, zircon silicate, sillimanite, magnesium silicates, zircon, petalite, a alumina, aluminosilicates and the like. Other ceramic materials such as aluminum-titanate, silicon carbide and silicon nitride are also used for wall-flow filter substrates.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which a catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the current disclosure is not limited to a particular substrate type, material, or geometry.

In alternative embodiments, the substrate may be a wall flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Note that where the substrate is a wall-flow substrate, the catalyst composition can permeate into the pore structure of the porous walls (i.e., partially or fully occluding the pore openings) in addition to being disposed on the surface of the walls.

Figure 2:
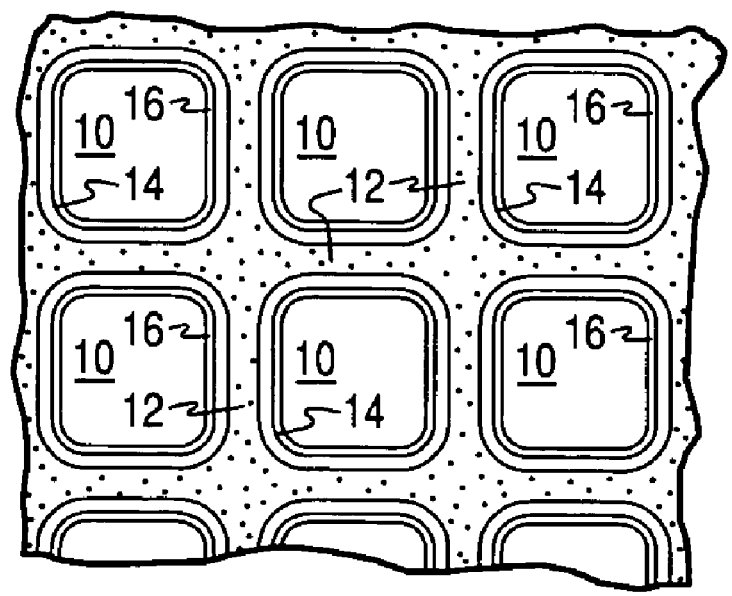
FIG. 2 is a partial cross-sectional view enlarged relative to FIG. 1 and taken along a plane parallel to the end faces of the substrate carrier of FIG. 1, which shows an enlarged view of a plurality of the gas flow passages shown in FIG. 1, in an embodiment wherein the substrate is a monolithic flow-through substrate.

FIGS. 1 and 2 illustrate an exemplary substrate 2 in the form of a flow-through substrate coated with a washcoat composition as described herein. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As more easily seen in FIG. 2, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the substrate member and a second discrete top washcoat layer 16 coated over the bottom washcoat layer 14. The present disclosure can be practiced with one or more (e.g., 2, 3, or 4) washcoat layers and is not limited to the illustrated two-layer embodiment.

For example, in one embodiment, a catalytic article comprises a catalytic material with multiple layers, wherein each layer has a different catalyst composition. For example, the bottom layer (e.g., layer 14 of FIG. 2) can comprise an AMOx catalyst composition (e.g., a PGM component, such as platinum, disposed on a support material) and the top layer (e.g., layer 16 of FIG. 2) can comprise the zeolite-containing catalyst composition of the present disclosure. In other embodiments, a catalytic article comprises a catalytic material with multiple layers, wherein each layer has one or more different catalyst components of the same catalyst composition. For example, in some embodiments, the bottom layer (e.g., layer 14 of FIG. 2) comprises the first zeolite and the top layer (e.g., layer 16 of FIG. 2) comprises the second zeolite of the disclosed catalyst composition. In some embodiments, the bottom layer (e.g., layer 14 of FIG. 2) comprises the second zeolite and the top layer (e.g., layer 16 of FIG. 2) comprises the first zeolite.

In some embodiments, one layer can comprise all of one zeolite and a portion of the other zeolite and one layer comprises the remainder of that zeolite. In some embodiments, for example, the bottom layer (e.g., layer 14 of FIG. 2) comprises a first portion of the first zeolite and the top layer (e.g., layer 16 of FIG. 2) comprises the second zeolite and a second portion the first zeolite. In some embodiments, the bottom layer (e.g., layer 14 of FIG. 2) comprises the second zeolite and a first portion of the first zeolite and the top layer (e.g., layer 16 of FIG. 2) comprises a second portion of the first zeolite.

Figure 3:
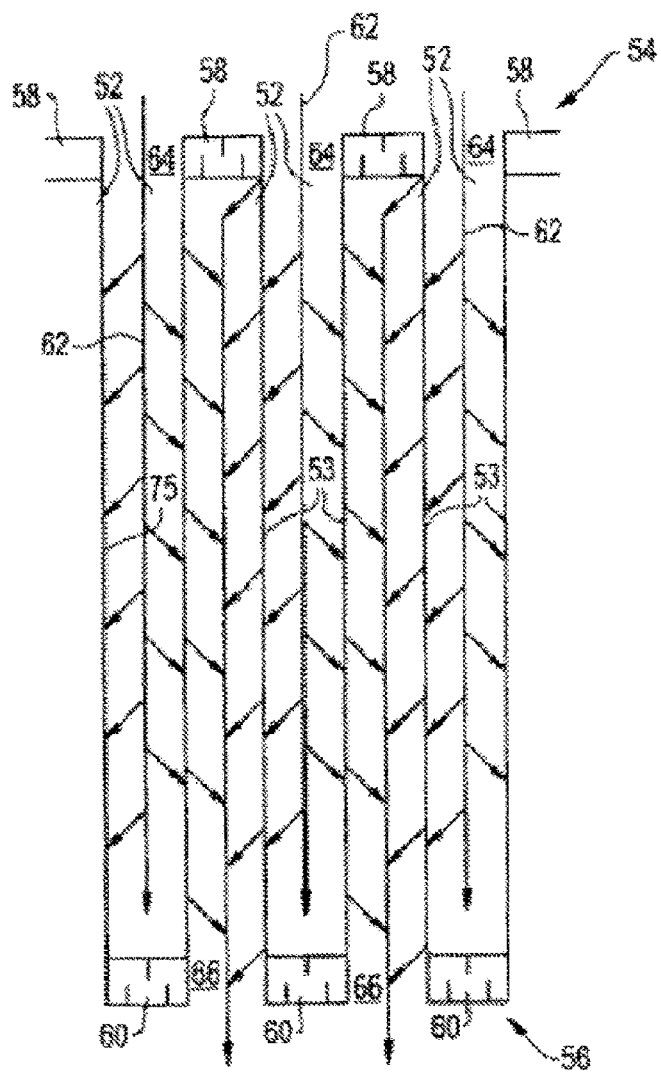
FIG. 3 is a cutaway view of a section enlarged relative to FIG. 1, wherein the honeycomb-type substrate in FIG. 1 represents a wall flow filter substrate monolith.
Figure 4:
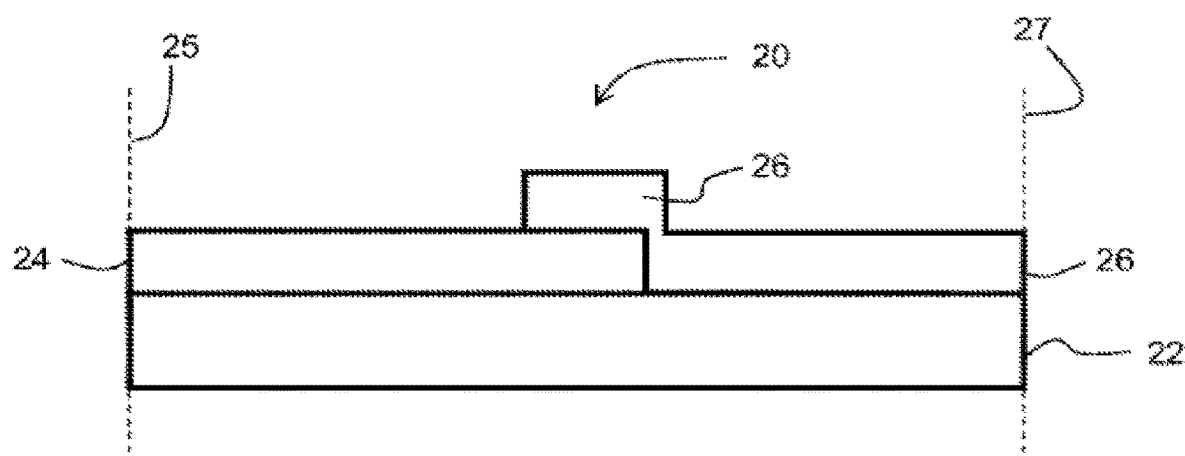
FIG. 4 is a cross-sectional view of an embodiment of a zoned catalytic article with partially overlapping layers.

FIG. 3 illustrates an exemplary substrate 2 in the form a wall flow filter substrate coated with a washcoat composition as described herein. As seen in FIG. 3, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this disclosure is catalyzed in that the wall of said substrate has thereon or contained therein one or more catalytic materials. Catalytic materials may be present on the inlet side of the substrate wall alone, the outlet side alone, or both the inlet and outlet sides. This disclosure includes the use of one or more layers of catalytic material within the wall as well as on the inlet and/or outlet walls of the substrate.

In some embodiments, the substrate can be coated at least twice with two separate washcoat slurries in an axially zoned configuration. For example, the same substrate can be coated once with one washcoat slurry and a second time with another slurry, wherein each washcoat is different. In some embodiments, the two separate washcoats may include separate catalyst compositions (i.e., a first catalyst composition and a second catalyst composition) or catalyst components of the same catalyst composition. For example, in some embodiments, the first catalyst composition comprises a catalyst composition of the present disclosure and the second catalyst composition comprises an AMOx catalyst composition (e.g., a PGM component, such as a platinum component, disposed on a support material). In another example, the first zeolite of the disclosed catalyst composition is contained in one coat and the second zeolite of the disclosed catalyst composition is contained in another coat. In one embodiment, one catalyst component may be coated first from the filter inlet end, and another catalyst component may be coated second from the filter outlet end. In yet another embodiment, one catalyst component may be coated first from the filter outlet end, and another catalyst component may be coated second from the filter inlet end.

Exemplary zoned substrates coated with washcoat layers such as the ones mentioned above, wherein the first washcoat layer is on the inlet end with washcoat coverage less than 95% of the filter length and the second washcoat layer is on the outlet end with washcoat coverage less than 95% of the filter length, are shown in FIGS. 4-8. For example, referring to FIG. 4, substrate 22, having an inlet end 25, an outlet end 27, and an axial length extending between the inlet end 25 and outlet end 27 contains two separate washcoat zones. A first washcoat zone 24, and a second washcoat zone 26 are applied to the substrate 22. The first washcoat zone 24 extends from the inlet end 25 and comprises a first catalyst composition or a first catalyst component and a second washcoat zone 26 extends from the outlet end 27 and comprises a second catalyst composition or second catalyst component. In some embodiments, the first washcoat zone 24 comprises a second catalyst composition or second catalyst component and the second washcoat zone 26 comprises a first catalyst composition or first catalyst component. The first washcoat zone 24 of specific embodiments extends from the front or inlet end 25 of the substrate 22 through the range of about 5% to about 95%, from about 5% to about 75%, from about 5% to about 50%, or from about 10% to about 35% of the length of the substrate 22. The second washcoat zone 26 extends from the rear of outlet end 27 of the substrate from about 5% about 95%, from about 5% to about 75%, from about 5% to about 50%, or from about 10% to about 35% of the total axial length of the substrate 22. In the embodiment shown in FIG. 4, the second washcoat zone 26 at least partially overlaps the first washcoat zone 24.

Figure 5:
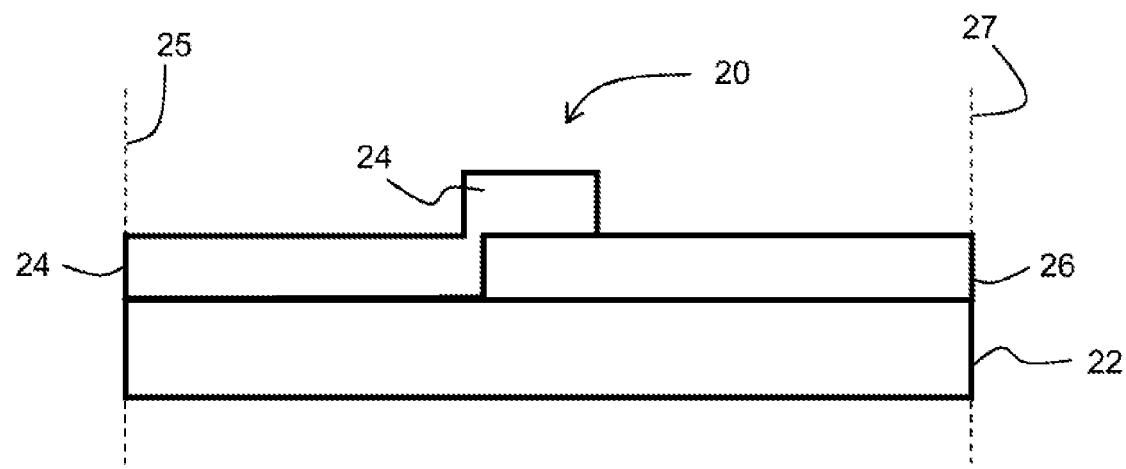
FIG. 5 is a cross-sectional view of a different embodiment of a zoned catalytic article with partially overlapping layers.

In another embodiment, as seen in FIG. 5, the first washcoat zone 24 extends from the inlet end 25 toward the outlet end 27. A second washcoat zone 26 is located adjacent and downstream from the first washcoat zone 24. The first washcoat zone 24 can at least partially overlap the second washcoat zone 26. In one embodiment, the first washcoat zone 24 comprises a first catalyst composition or first catalyst component and the second washcoat zone 26 comprises second catalyst composition or second catalyst component. In some embodiments, the first washcoat zone 24 comprises a second catalyst composition or second catalyst component and the second washcoat zone 26 comprises a first catalyst composition or first catalyst component. The first washcoat zone 24 of specific embodiments extends from the front or inlet end 25 of the substrate through the range of about 5% to about 95%, from about 5% to about 75%, from about 5% to about 50%, or from about 10% to about 35% of the length of the substrate 22. The second washcoat zone 26 extends from the rear of outlet end 27 of the substrate 22 from about 5% about 95%, from about 5% to about 75%, from about 5% to about 50%, or from about 10% to about 35% of the total axial length of the substrate 22.

Figure 6:
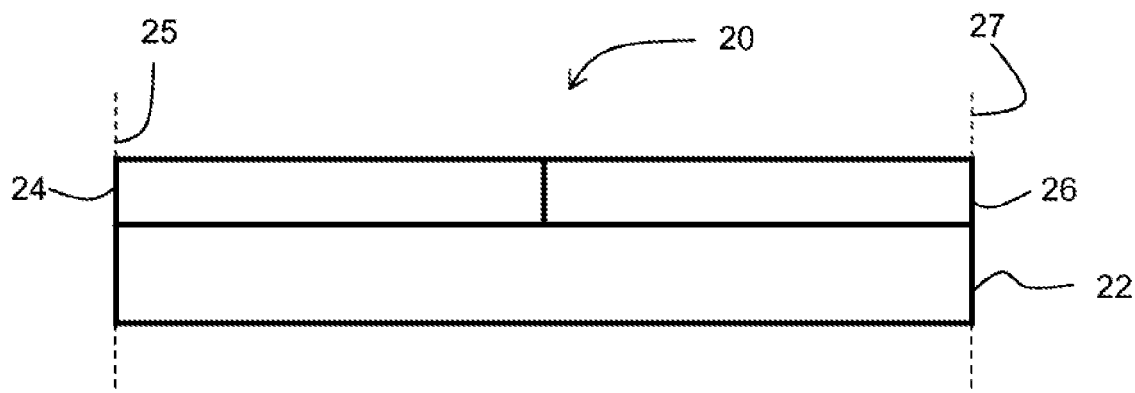
FIG. 6 is a cross-sectional view of an embodiment of a zoned catalytic article with no overlapping layers.

In another embodiment, referring to FIG. 6, the same substrate can be coated with two types of washcoat slurries in two separate zones, wherein a first washcoat zone 24 including a washcoat of a first catalyst composition or first catalyst component and a second washcoat zone 26 includes a washcoat of a second catalyst composition or second catalyst component are located side by side along the length of the substrate 22, with no overlap of the zones. In some embodiments, the first washcoat zone 24 comprises a second catalyst composition or second catalyst component and the second washcoat zone 26 comprises a first catalyst composition or first catalyst component. The first washcoat zone 24 of specific embodiments extends from the front or inlet end 25 of the substrate 22 through the range of about 5% to about 95%, from about 5% to about 75%, from about 5% to about 50%, or from about 10% to about 35% of the length of the substrate 22. The second washcoat layer 26 extends from the rear of outlet end 27 of the substrate 22 from about 5% to about 95%, from about 5% to about 75%, from about 5% to about 50%, or from about 10% to about 35% of the total axial length of the substrate 22.

Figure 7:
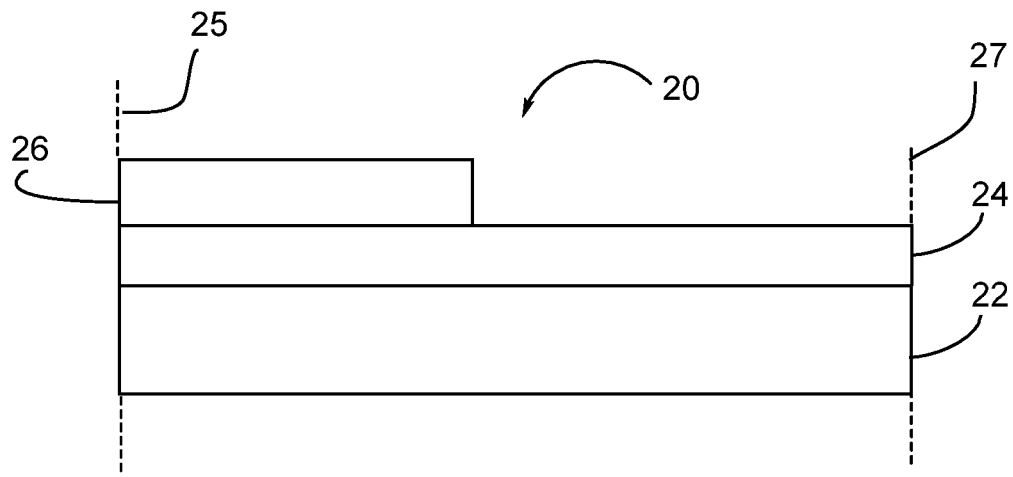
FIG. 7 is a cross-sectional view of an embodiment of a layered catalytic article.

In another embodiment, as seen in FIG. 7, a substrate 22 can be coated with a first washcoat zone 24 extending from the front or inlet end 25 of the substrate 22 to the rear or outlet end 27 of the substrate 22 and a second washcoat layer 26 that is coated over the first washcoat zone 24 proximate the front or inlet end 25 of the substrate 22 and extending across only a partial length of the substrate 22 (i.e., terminating before reaching the rear or outlet end 27 of the substrate 22). In specific embodiments, the second washcoat zone 26 extends from the front of inlet end 25 of the substrate 22 from about 5% to about 95%, from about 5% to about 75%, from about 5% to about 50%, or from about 10% to about 35% of the total axial length of the substrate 22.

Figure 8:
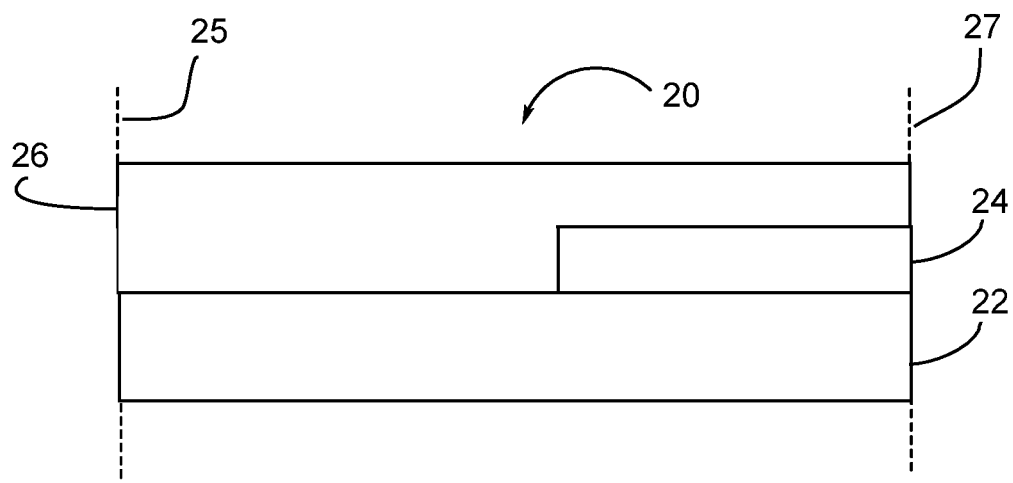
FIG. 8 is a cross-sectional view of an embodiment of a different layered catalytic article.

In another embodiment, as seen in FIG. 8, a substrate 22 can be coated with a first washcoat zone 24 proximate the rear or outlet end 25 of the substrate 22 and extending only partially along the length of the substrate 22 (i.e., terminating before reaching the front or inlet end 25 of the substrate 22). The substrate 22 can be coated with a second washcoat zone 26. As seen in FIG. 8, the second washcoat zone 26 extends from the front or inlet end 25 of the substrate 22 to the rear or outlet end 27 of the substrate 22 (and thus is coated completely over the first washcoat zone 26). In specific embodiments, the first washcoat zone 24 extends from the rear of outlet end 27 of the substrate 22 from about 5% to about 95%, from about 5% to about 75%, from about 5% to about 50%, or from about 10% to about 35% of the total axial length of the substrate 22.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$") are used herein to mean the weight of a component per volume of the substrate, including the volume of void spaces of the substrate. Other units of weight per volume such as g/L are also sometimes used. The total loading of the catalyst composition of the present disclosure on the substrate is typically from about 0.1 to about 6 g/in$^3$, more typically from about 1 to about 5 g/in$^3$, or from about 1 to about 3 g/in$^3$. The total loading of the first (metal-promoted) zeolite on the substrate is typically from about 0.1 to about 6 g/in$^3$, or more typically from about 1 to about 3 g/in$^3$. The total loading of the second zeolite on the substrate is typically from about 0.05 to about 1 g/in$^3$. It is noted that these weights per unit volume are typically calculated by weighing the substrate before and after treatment with the catalyst washcoat composition, and since the treatment process involves drying and calcining the substrate at high temperature, these weights represent an essentially solvent-free catalyst coating as essentially all of the water of the washcoat slurry has been removed.

Method of Making the Catalyst Compositions

As described above, catalyst compositions disclosed herein are prepared so as to initially comprise a first (metal-promoted) zeolite and a second (non-metal-promoted) zeolite (i.e., a zeolite that is substantially free of promoter metal). Zeolites are generally provided in the alkali metal form, or the H$^+$ form, or the NH$_4^+$ form. To provide the second (non-metal-promoted) zeolite, in some embodiments, no further treatment is conducted (i.e., the second zeolite is incorporated directly into the catalyst composition with no chemical modification). Depending on the form, the zeolite may be further modified before incorporation. For example, a zeolite in alkali metal form can be exchanged with NH$_4^+$ ions in solution to give the zeolite in NH$_4^+$ form. Similarly, a zeolite in H$^+$ or NH$_4^+$ form can be exchanged with alkali metal ions to give the zeolite in alkali metal form.

To provide the first (metal-promoted zeolite), in some embodiments, a zeolite in the alkali form is typically ion-exchanged with one or more metals (e.g., copper). The ion-exchange process generally comprises exchanging ions residing in a porous support with an outside proton ion or metal ion of interest. For example, zeolites prepared with sodium ions residing in the pores can be exchanged with a different ion to form an ion-exchanged zeolite. This is accomplished by preparing a slurry of the zeolite in a solution containing the desired promoter metal, i.e., a metal precursor solution. Aqueous solutions of water soluble compounds or complexes of the metal precursors are typically utilized, such as metal salts (e.g. phosphates, nitrates or acetate salts) of the metal precursors with specific examples including copper (II) nitrate, copper (II) acetate, iron (II) nitrate, iron (III) acetate and a combination thereof. The concentration of the metal precursor used to impregnate the zeolite may range from about 0.1 wt. % to about 50 wt. % relative to the weight of the metal ion-exchanged zeolite. Heat may be optionally applied during this process. The promoter metal ion can diffuse into the pores of the zeolite and exchange with the residing ion, i.e., sodium, to form the metal-ion exchanged zeolite. For example, a copper metal precursor solution made from a copper salt can be used for ion-exchanging copper into a zeolite in particulate form.

The zeolites are usually sufficiently dry to absorb substantially all of the solution to form a moist solid. Following treatment of the zeolite particles with the metal precursor solution, the zeolite particles are dried, such as by heat treating the zeolite particles at elevated temperature (e.g., 100-150° C.) for a period of time (e.g., 1-3 hours), and then calcining to convert the metal components to a more catalytically active oxide form (e.g., the ion-exchanged metal). An exemplary calcination process involves heat treatment in air or steam/air at a temperature of about 500-800° C. for about 1-3 hours. The amount of steam can vary, but is typically in the range from about 0.5% to about 15% (or at least 0.5%, at least 1%, at least 2%, at least 3%, at least 4%, at least 5%, at least 6%, at least 7%, at least 8%, at least 9%, at least 10%, with an upper boundary of about 15%). The above process can be repeated as needed to reach the desired level of promoter metal impregnation. The resulting material can be stored as a dry powder or in slurry form.

For metal-promoted zeolites comprising two or more metals, ion-exchanging of the metals into the zeolite can be carried out at the same time or separately. For example, copper precursors in combination with one or more other metal precursors can be employed. In certain embodiments, the method comprises exchanging the second metal into a zeolite that has first been promoted with the first metal (e.g., exchanging a second metal into a copper-promoted zeolite). For examples of the preparation of copper and/or iron promoted chabazite zeolites, see U.S. Pat. No. 9,352,307 to Stiebels et al.; U.S. Pat. No. 9,162,218 to Bull et al.; U.S. Pat. No. 8,821,820 to Seyler et al.; U.S. Pat. No. 8,404,203 to Bull et al.; U.S. Pat. No. 8,293,199 to Beutel et al.; U.S. Pat. No. 7,601,662 to Bull et al.; U.S. Pat. No. 5,293,198 to Beutel et al; U.S. Patent Application Publication Nos. 2015/0231620 to Montreuil et al.; 2010/0092362 to Li et al.; International Patent Application Publication Nos. WO2010/054034 to Bull et al.; and WO2009/141324 to Turkhan et al., which are all incorporated by reference herein in their entireties.

Substrate Coating Process

The disclosed catalyst composition containing a combination of a first zeolite and a second zeolite is mixed with water to form a slurry for purposes of coating a catalyst substrate, such as a honeycomb-type substrate. As mentioned above, in some embodiments, the first zeolite and the second zeolite can be in separate washcoat slurries but in certain embodiments preferred embodiments, the first and second zeolites are contained in the same washcoat slurry. In addition to the first zeolite and/or the second zeolite, the slurry may optionally contain alumina or a zirconium salt (such as zirconium acetate) as a washcoat binder, water-soluble or water-dispersible stabilizers (e.g., barium acetate), promoters (e.g., lanthanum nitrate), associative thickeners, and/or surfactants (including anionic, cationic, non-ionic or amphoteric surfactants). When present, the washcoat binder is typically used in an amount of about 0.05 $g/in^3$ to about 1 $g/in^3$. The alumina binder can be, for example, boehmite, gamma-alumina, or delta/theta alumina.

The slurry can be milled to enhance mixing of the particles and formation of a homogenous material. The milling can be accomplished in a ball mill, continuous mill, jet mill, or other similar equipment, and the solids content of the slurry may be, e.g., about 10-60 wt. %, more particularly about 20-40 wt. %. In one embodiment, for coating flow-through monolith substrate, the post-milling slurry is characterized by a D90 particle size of about 10 to about 40 microns, preferably 10 to about 30 microns, more preferably about 10 to about 15 microns. The D90 is defined as the particle size at which 90% of the particles have a finer particle size. In another embodiment, for coating wall-flow filters, the post-milling slurry is characterized by a D90 particle size of about 2 to about 10 microns, preferably 3 to about 6 microns, more preferably about 4 to about 5 microns.

The one or more slurries are then coated on the substrate using a washcoat technique known in the art. In one embodiment, the substrate is dipped one or more times in the same slurries or different slurries or otherwise coated with the same slurry or different slurries. Thereafter, the coated substrate is dried at an elevated temperature (e.g., 100-200° C.) for a period of time (e.g., 10 minutes to 3 hours) and then calcined by heating, e.g., at 400-850° C., typically for about 10 minutes to about 3 hours. In some embodiments, the coated substrate is calcined at a temperature of about at least 400° C., at least 450° C., at least 500° C., at least 550° C., at least 600° C., at least 650° C., at least 700° C., at least 750° C., or of about at least 800° C. with an upper boundary of about 850° C. Following drying and calcining, the final washcoat can be considered as essentially solvent-free.

Such calcining may or may not affect the redistribution of promoter metal between the first and second zeolite referenced herein. For example, in some embodiments, at relatively low calcination temperatures (e.g., up to about 500° C. or up to about 600° C. or up to about 650° C.), little to no redistribution of the promoter metal may be observed (i.e., all or substantially all of the promoter metal remains associated with only the first zeolite) after calcination. At higher temperatures (e.g., at least 650° C., at least 700° C., at least 750° C., at least 800° C., or at least 850° C.), a portion of the promoter metal is redistributed between the first zeolite and the second zeolite, wherein the amount of the promoter metal being redistributed is temperature dependent. For example, a higher calcination temperature typically leads to a larger amount of promoter metal being redistributed from the first to the second zeolite, whereas at a lower calcination temperature, a smaller amount of promoter metal is generally redistributed from the first to the second zeolite.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

In some embodiments, the calcined coated substrate is aged. Aging can be conducted under various conditions and, as used herein, "aging" is understood to encompass a range of conditions (e.g., temperature, time, and atmosphere). Exemplary aging protocols involve subjecting the calcined coated substrate to a temperature of 650° C. for about 50 hours in 10% steam, 750° C. for about 20 hours in 10% steam, or to a temperature of 800° C. for about 16 hours in 10% steam, or 850° C. for 5 hours in 10% steam. However, these protocols are not intended to be limiting and the temperature can be lower or higher (e.g., including but not limited to, temperatures of about 400° C. and higher, e.g., about 400° C. to about 900° C., about 600° C. to about 900° C., or about 650° C. to about 900° C.); the time may be lesser or greater (e.g., including but not limited to, times of about 1 hour to about 200 hours or about 2 hours to about 25 hours); and the atmosphere can be modified (e.g., to have different amounts of steam and/or other constituents present therein). In some embodiments, the atmosphere has an amount of steam of about 1 to about 15% or about 5 to about 10% steam (or no more than about 10%, no more than about 9%, no more than about 8%, no more than about 7%, no more than about 6%, no more than about 5%, no more than about 4%, no more than about 3%, no more than about 2%, or no more than about 1%). In some embodiments, the temperature is at least 400° C., at least 450° C., at least 500° C., at least 550° C., at least 600° C., at least 650° C., at least 700° C., at least 750° C., at least 800° C., at least 850° C. with an upper boundary of about 900° C. In certain embodiments, the catalysts are aged at a temperature of at least about 450° C. to about 900° C. for at least about 1 to about 200 hours (e.g., at least about 500° C. to about 850° C., at least about 600° C. to about 850° C., or at least about 700° C. to about 850° C.; for at least about 5 to about 50 hours, or about 5 to about 20 hours).

Aging typically but does not always affect the redistribution of promoter metal between the first and second zeolite. For example, as referenced above with respect to varying amounts of redistribution occurring at varying calcination temperatures, the temperature of aging may affect the extent (if any) of promoter metal redistribution. Further, it is understood that when some redistribution has already occurred under particular calcination temperatures, further redistribution upon aging may or may not occur (depending, e.g., on the amount of redistribution that occurred during calcination and on the specific conditions of aging).

Emission Treatment System

The present disclosure also provides an emission treatment system that incorporates a catalytic article as described herein. Typically, integrated emissions treatment systems comprise one or more catalytic articles/components for the treatment of exhaust gas emissions, e.g., exhaust gas emissions from a diesel engine. For example, the emission treatment system may further comprise one or more of a diesel oxidation (DOC) catalyst, a catalyzed soot filter (CSF), a selective catalytic reduction (SCR) catalyst, and a selective catalytic reduction/ammonia oxidation (SCR/AMOx) catalyst, in addition to the catalytic article described herein. Some emission treatment systems include a lean $NO_x$ trap, a CSF catalyst, a SCR catalyst and/or a SCR/AMOx catalyst. The CSF, loaded with either PGM containing catalysts for CO/HC conversion or NO oxidation or with SCR catalysts for the SCR reaction (SCRoF), is typically located downstream from the DOC or LNT catalyst, although the relative placement of the various components of the emission treatment system can be varied. The DOC can be any catalyst conventionally used to combust unburned gaseous and non-volatile hydrocarbons (i.e., the SOF) and carbon monoxide to form carbon dioxide and water and typically comprises a platinum group metal supported on an oxygen storage component (e.g., ceria) and/or refractory metal oxide support (e.g., alumina) The SCR catalyst can be any catalyst conventionally used to abate $NO_x$ present in engine exhaust and typically comprises a mixed metal oxide composition (e.g., vanadia/titania) or a metal ion-exchanged molecular sieve composition (e.g., Cu and/or Fe-promoted molecular sieve). The catalyzed soot filter (CSF) is designed to trap and burn soot and is coated with a washcoat layer containing one or more catalysts for burning trapped soot and or oxidizing exhaust gas stream emissions (e.g., one or more precious group metal catalysts such as platinum, palladium, and/or rhodium). The SCR/AMOx catalyst refers to an ammonia oxidation catalyst used to remove any slipped ammonia from the exhaust gas treatment system combined with an SCR catalyst (e.g., an AMOx catalyst in a bottom coat with PGM layered with a top coat of a catalyst with SCR functionality). The emission treatment system can further include components such as a reductant injector for ammonia precursor, a hydrocarbon injector for diesel fuel, additional particulate filtration components, and/or $NO_x$ storage and/or trapping components. The preceding list of components is merely illustrative and should not be taken as limiting the scope of the disclosure.

Figure 9:
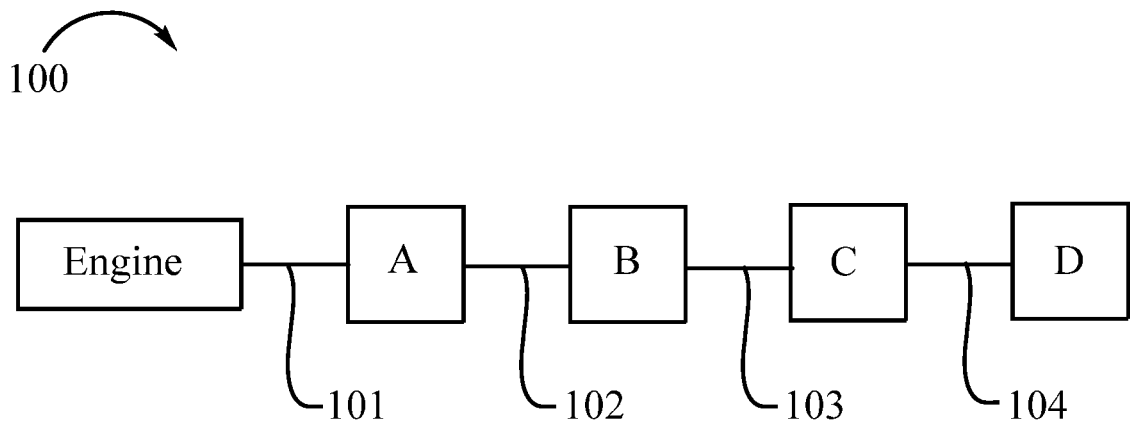
FIG. 9 shows a schematic depiction of various embodiments of an emission treatment system comprising a SCR catalytic article as disclosed herein.

One exemplary emission treatment system is illustrated in FIG. 9, which is a schematic representation of an emission treatment system 100. As shown, an exhaust gas stream containing gaseous pollutants and particulate matter is conveyed via exhaust pipe 101 from an engine to a catalyst component A. Exhaust pipe 102 directs the treated exhaust gas stream exiting catalyst component A to catalyst component B. Next, exhaust pipe 103 directs the treated exhaust gas exiting catalyst component B to catalyst component C, which is located upstream of catalyst component D. Without limitation, Table 1 presents various exhaust gas treatment system configurations of one or more embodiments.

TABLE 1

Exemplary Exhaust Gas Treatment System Configurations

| Catalyst Component A | Catalyst Component B | Catalyst Component C | Catalyst Component D |
|---|---|---|---|
| DOC | SCR* | CSF | — |
| SCR* | DOC | CSF | SCR*/AMOx |
| DOC | SCR* | AMOx | — |
| DOC | CSF | SCR* | AMOx |
| DOC | SCRoF* | SCR/AMOx | — |
| DOC | SCRoF* | AMOx | — |
| DOC | SCRoF* | SCR | — |
| LNT | CSF | SCR* | AMOx |
| LNT | SCRoF* | SCR* | AMOx |

*comprising the disclosed (zeolite-containing) catalyst composition

With respect to the SCR process, provided herein is a method for the reduction of $NO_x$ in an exhaust gas, which comprises contacting the exhaust gas with the catalyst composition described herein for a time and temperature sufficient to reduce the level of $NO_x$ in the exhaust gas stream. In some embodiments, the catalyst composition has been exposed to high temperatures prior to contact with the exhaust gas stream. In some embodiments, the catalyst composition is fresh. In some embodiments, the temperature range is from about 150° C. to about 600° C. In some embodiments, the temperature range is from about 150° C. to about 350° C. or from about 450° C. to about 750° C. In some embodiments, the catalyst composition reduces $NO_x$ in the exhaust gas stream at a temperature ranging from about 150° C. to about 350° C. by an amount of about 30% to about 99%, or about 40% to about 60% (or at least about 40%, at least about 50%, at least about 60%, at least about 70%, at least about 80%, or at least about 90%). For example, at a temperature of about 200° C. the high temperature treated catalyst composition of the disclosure reduces the level of $NO_x$ in the exhaust gas by an amount of about 40% to about 60% (or at least about 40% or at least about 50%). In some embodiments, the catalyst composition reduces $NO_x$ in the exhaust gas stream at a temperature ranging from about 450° C. to about 750° C. by an amount of about 30% to about 99%, or about 40% to about 60% (or at least about 40%, at least about 50%, at least about 60%, at least about 70%, at least about 80%, or at least about 90%). For example, at a temperature of about 600° C., the catalyst composition of the disclosure, in some embodiments, reduces the level of $NO_x$ in the exhaust gas by an amount of about 40% to about 60% (or at least about 40% or at least about 50%) at a temperature of 600° C. In some embodiments, the catalyst composition reduces $NO_x$ in an amount ranging from about 40% to about 60% at a first temperature and a second temperature, wherein the first temperature ranges from about 150° C. to about 350° C. and the second temperature ranges from about 450° C. to about 750° C. Such values are particularly relevant in the context of the disclosed (zeolite-containing) catalyst composition in aged form, as referenced herein.

EXPERIMENTAL

Aspects of the present disclosure are more fully illustrated by the following examples, which are set forth to illustrate certain aspects of the present disclosure and are not to be construed as limiting thereof.

Example 1—Preparation and Testing of Catalytic Articles

SCRoF samples were prepared by washcoating a catalyst slurry onto a wall-flow filter substrate. A catalyst slurry was prepared by mixing a Cu-CHA component with a H-zeolite component that were individually milled to $D_{90}$<5 μm (90% particles less than 5 μm). The resulting slurry was coated on a filter substrate twice to obtain the target washcoat loading, first from the inlet and then from the outlet with calcination (450° C./1 h) after both the first and second catalyst application. The substrate is a SiC flow-through filter segment (34 mm×34 mm×153 mm) with 63% porosity, 23 μm mean pore size, a cell density of 300 cells/in² and a wall thickness of 0.3 mm.

Table 2 describes the coating compositions for Samples 1 to 8 and their experimentally determined washcoat loadings. The reference sample (Sample 1) is a single component catalyst, containing 1.5 g/in³ Cu-CHA with SAR of 27 and CuO loading of 3.2% by weight. Samples 2 to 8 are two-component catalysts that include 0.15 g/in³ H-zeolite in addition to 1.5 g/in³ Cu-CHA. Thus, all samples contain about the same amount of Cu-CHA.

TABLE 2

Sample designs and actual washcoat loading

| | Coating Composition | Experimental Washcoat Loading (g/in³) | | |
|---|---|---|---|---|
| Sample ID | Cu-CHA (g/in³) | Second zeolite/ 0.15 g/in³ | Cu-CHA | Second zeolite | Total |
| 1 | 1.5 | None | 1.51 | none | 1.51 |
| 2 | 1.5 | H—Y (SAR = 30) | 1.52 | 0.15 | 1.67 |
| 3 | 1.5 | H-Mordenite (SAR = 20) | 1.54 | 0.15 | 1.69 |
| 4 | 1.5 | H-ZSM-5 (SAR = 30) | 1.48 | 0.15 | 1.63 |
| 5 | 1.5 | H-Beta (SAR = 25) | 1.55 | 0.15 | 1.70 |
| 6 | 1.5 | H-Ferrierite (SAR = 20) | 1.50 | 0.15 | 1.65 |
| 7 | 1.5 | H-CHA (SAR = 27) | 1.52 | 0.15 | 1.67 |
| 8 | 1.5 | H-Beta (SAR > 100) | 1.48 | 0.15 | 1.63 |

Catalyst Testing:

Before testing, the catalysts were aged at 850° C. for 5 h with 10% $H_2O$ in air. They were then evaluated for $NH_3$ adsorption and desorption as well as for steady-state SCR performance. The $NH_3$ adsorption was conducted at 200° C. under the standard SCR conditions (500 ppm NO, 500 ppm $NH_3$, 10% $O_2$, 5% $H_2O$, 5% $CO_2$ and balance $N_2$) at GHSV=60,000 h$^{-1}$. NO was first introduced to the system along with the unreactive gases. When the NO flow was stabilized, $NH_3$ was introduced to the system, which simultaneously triggered the SCR reaction and $NH_3$ adsorption. The amount of $NH_3$ adsorbed on the catalyst was calculated by $NH_3$ balance ($NH_3$ in —$NH_3$ out —$NH_3$ consumed by SCR —$NH_3$ oxidation). Both $NO_x$ conversion and the $NH_3$ adsorption were continuously measured and calculated as a function of time. After the catalyst reached a steady-state, i.e. $NO_x$ conversion was stabilized, the catalyst was purged with a stream of non-reactive gases (10% $O_2$, 5% $H_2O$, 5% $CO_2$ and balance $N_2$) at GHSV=60,000 h$^{-1}$ for 1 h at 200° C., and the temperature was ramped to 550° C. to allow $NH_3$ to desorb from the catalyst (temperature-programmed desorption or TPD). Cumulative $NH_3$ desorption was obtained by integrating the amount of $NH_3$ desorbed during the isothermal period (at 200° C.) and TPD (200-550° C.).

The steady-state SCR reaction was conducted with a feed containing 500 ppm NO, 500 ppm $NH_3$, 10% $O_2$, 5% $H_2O$, 5% $CO_2$ and balance $N_2$ at GHSV=60,000 h$^{-1}$ from 200 to 600° C. The temperature ramp rate was 2.5° C./min. $NO_x$ conversion and $N_2O$ formation were continuously monitored and recorded during the temperature run experiment.

Figure 10:
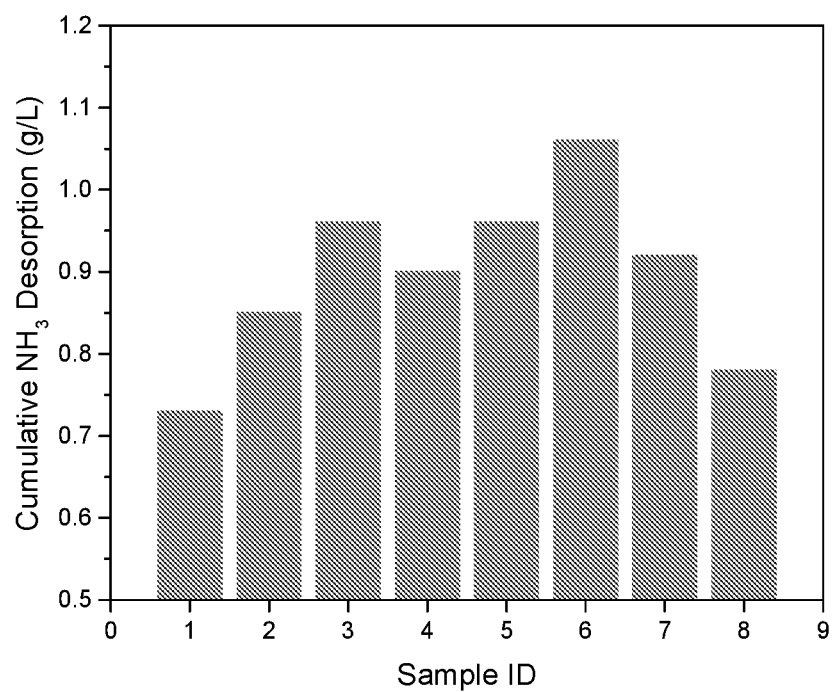
FIG. 10 is a graph showing cumulative $NH_3$ desorption for test samples 1-8.

Test Results:

FIG. 10 shows the cumulative $NH_3$ desorption (isothermal+TPD) for Samples 1 to 8. The reference SCRoF (Sample 1) shows the lowest $NH_3$ capacity (0.72 g/L), while Sample 6 (Cu-CHA+H-FER) is the highest (1.06 g/L), a 47% increase with respect to the reference (Sample 1). Other SCRoF samples also show variable degrees of increase in $NH_3$ capacity. Sample 8 (Cu-CHA+H-Beta with SAR>100) shows a comparable, but still better, $NH_3$ capacity to the reference (Sample 1).

Figure 11:
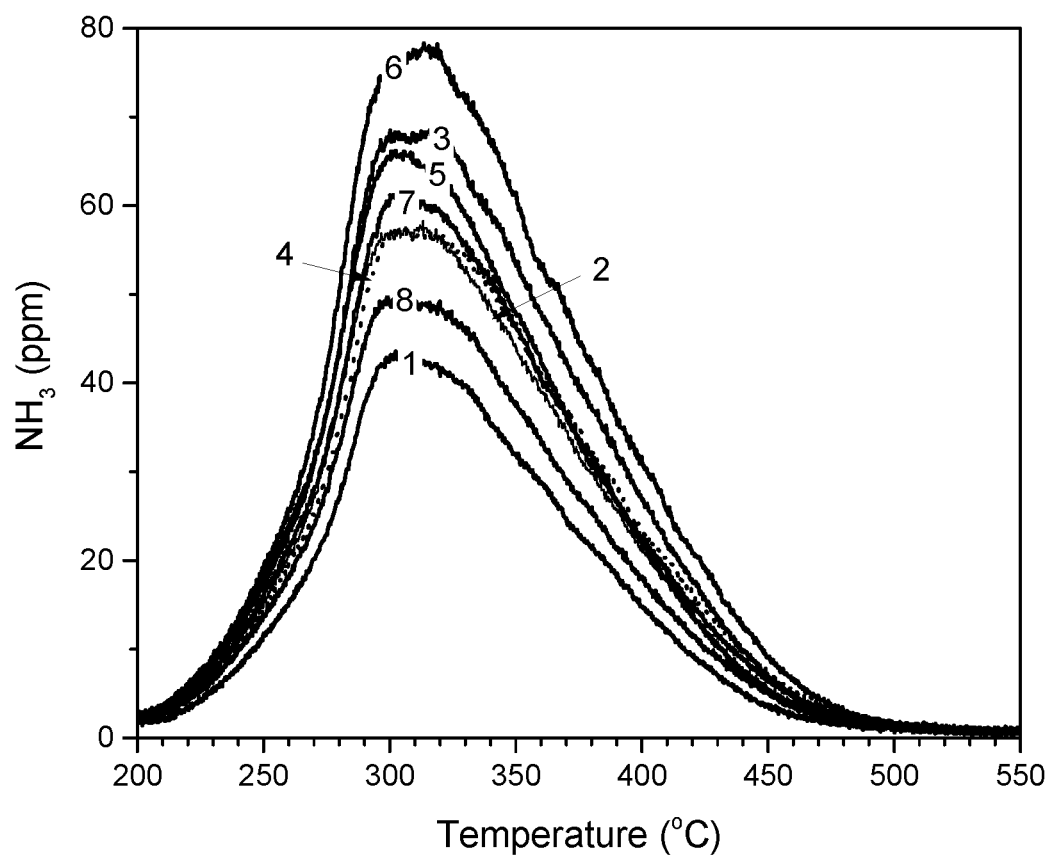
FIG. 11 is a graph showing temperature-programmed desorption (TPD) profiles of test samples 1-8.

FIG. 11 shows the TPD profiles of these samples. The order of the $NH_3$ desorption intensity follows exactly that of the cumulative $NH_3$ desorption. As shown in the TPD profiles, all SCRoF samples show a single desorption peak, which is attributed to the $NH_3$ adsorption on the exchanged Cu sites. Many of the H-zeolites are not stable after 850° C. hydrothermal aging. Thus, the substantial increase in $NH_3$ storage capacity of the mixture samples of this disclosure suggests an unexpected synergistic effect taking place during the high temperature aging, increasing the number of exchanged Cu sites relative to the Cu-CHA reference.

Figure 12:
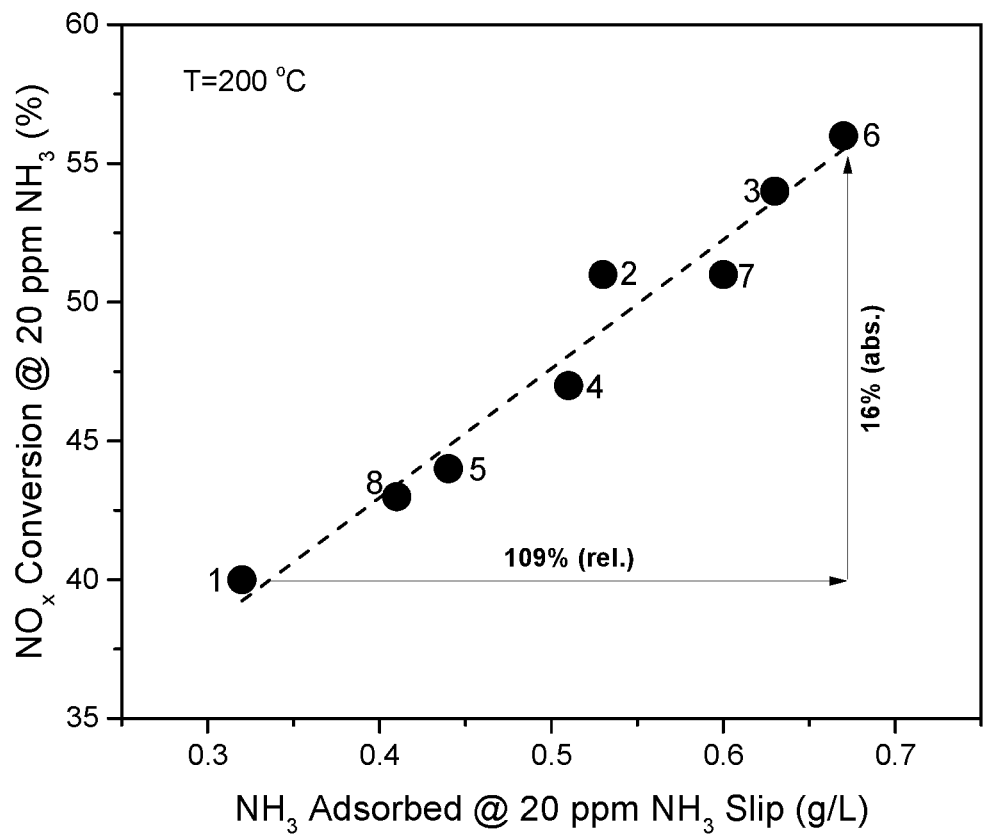
FIG. 12 is a plot of the correlation between $NO_x$ conversion and $NH_3$ adsorption of test samples 1-8.

FIG. 12 provides correlations between the $NO_x$ conversion at 20 ppm $NH_3$ slip and the $NH_3$ adsorbed up to this point. The $NO_x$ conversion is linearly proportional to the $NH_3$ adsorbed. Compared to Sample 1, Sample 6 shows 109% higher $NH_3$ adsorption capacity and 16% higher $NO_x$ conversion at 200° C.

Figure 13:
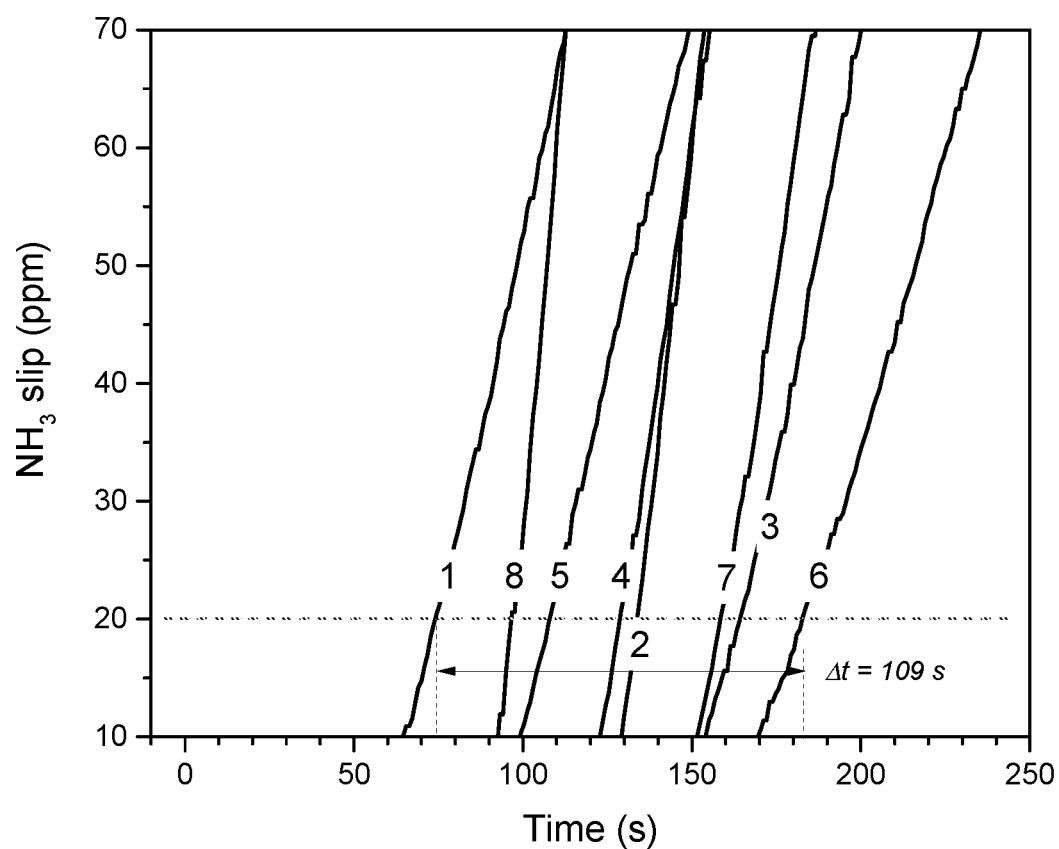
FIG. 13 is a line graph showing the $NH_3$ slip profiles during dynamic $NH_3$ adsorption-desorption of test samples 1-8.

FIG. 13 shows the $NH_3$ slip profiles during the dynamic $NH_3$ adsorption-desorption test at 200° C. Measured at 20 ppm $NH_3$ slip level, Sample 6 shows the longest delay in $NH_3$ slip relative to Sample 1 (by 109 s), followed by Sample 3 (90 s), Sample 7 (85 s), Sample 2 (60 s), Sample 4 (54 s), Sample 5 (34 s) and Sample 8 (23 s).

Figure 14:
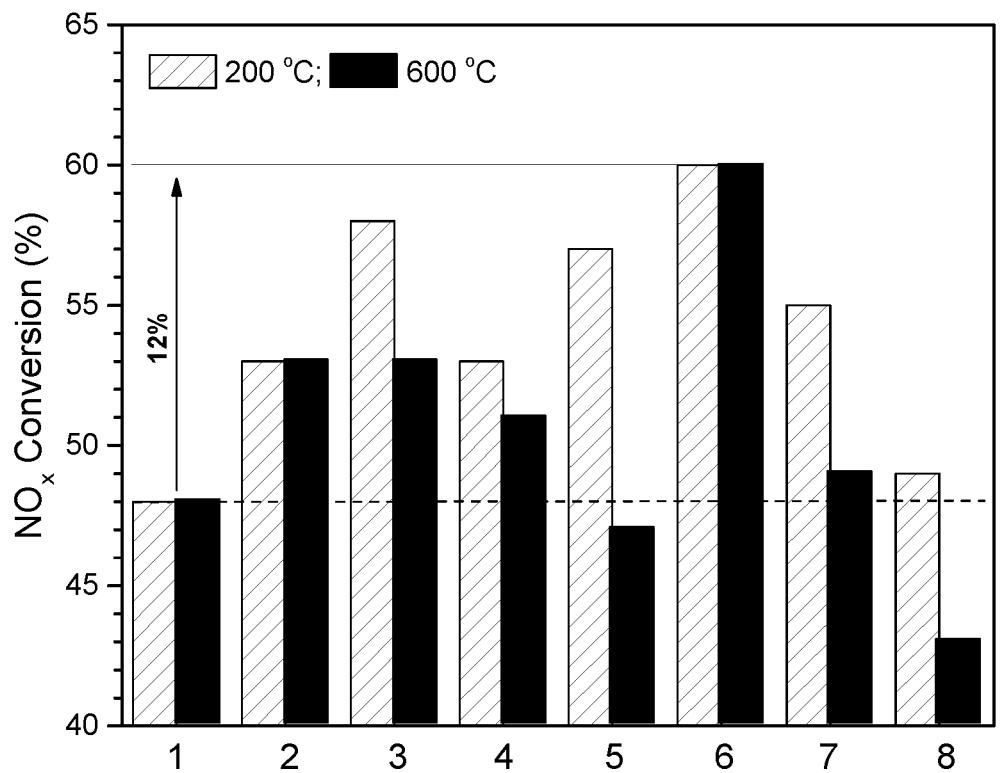
FIG. 14 is a bar graph showing $NO_x$ conversions at 200° C. and 600° C. based on light-off data of samples 1-8.

FIG. 14 shows the $NO_x$ conversions at 200° C. and 600° C. taken from the light-off data. All of Samples 2-7 show increased $NO_x$ conversion at 200° C. compared to the reference (Sample 1). Among them, Sample 6 shows the highest $NO_x$ conversion increase (□$NO_x$ conversion=12%), followed by Samples 3 (10%), 5 (9%), 7 (7%), 3 (5%) and 4 (5%). Some samples also show a $NO_x$ conversion increase at 600° C. (e.g., 12%, 7%, and 7% for Samples 6, 2 and 3, respectively). Interestingly, Sample 6 shows the highest $NO_x$ conversion increase at both 200° C. and 600° C. compared to the reference (Sample 1).

Figure 15:
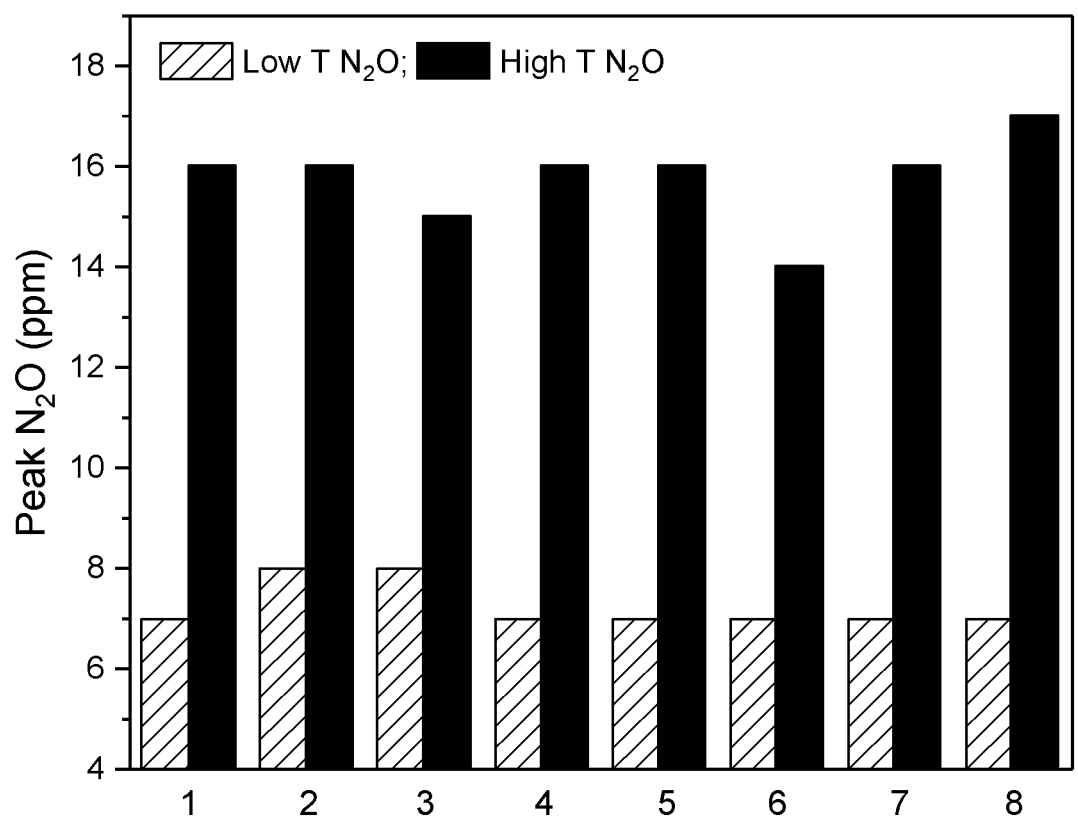
FIG. 15 is a bar graph showing $N_2O$ formation at low (230-240° C.) and high (550-580° C.) temperature during light-off testing.

FIG. 15 shows the peak $N_2O$ formation at low (230-240° C.) and high (550-580° C.) temperatures during the light-off test. Despite higher $NO_x$ conversion, the peak $N_2O$ formation of Sample 6 is the same as the reference (Sample 1) at low temperatures and is slightly lower at high temperatures.

Example 2

Figure 16:
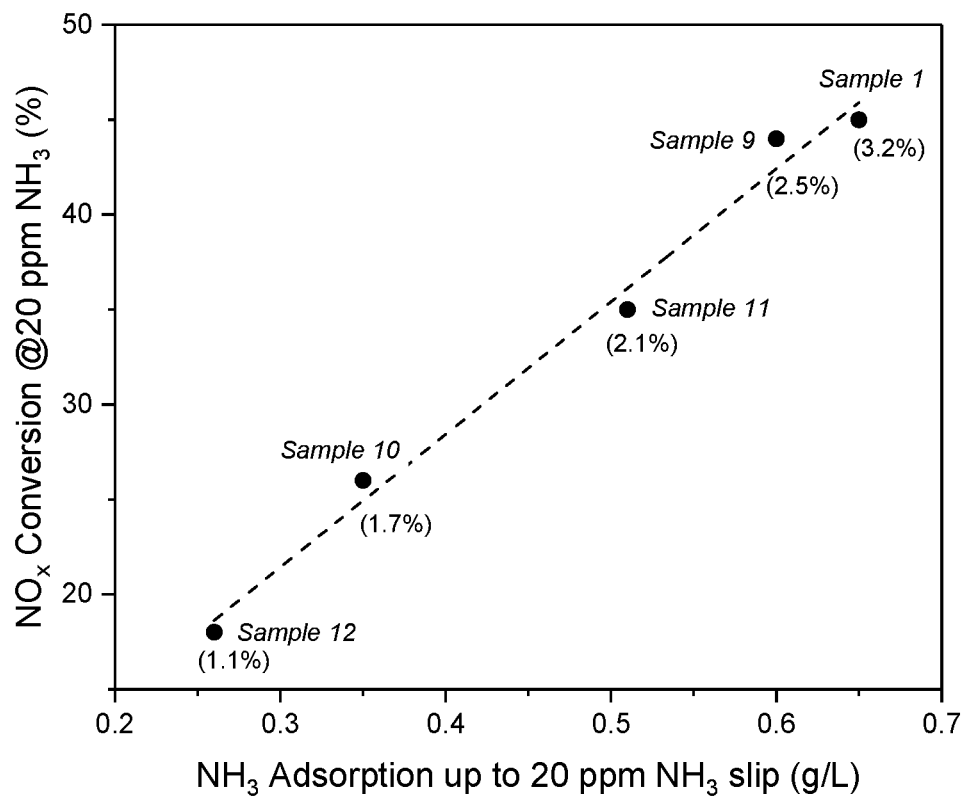
FIG. 16 is a plot of NOx conversion at 20 ppm $NH_3$ slip versus $NH_3$ storage capacity at 200° C.

Another set of samples was prepared with a method similar to that of Sample 1. Samples 9 and 10 contain reduced levels of CuO, 2.5 and 1.7%, respectively. Sample 11 and 12 were made by mixing Sample 1 (3.2% CuO) with a H-CHA zeolite at a Cu-CHA/H-CHA ratio of 1:2 and 2:1, respectively, so that the overall CuO concentrations in these catalysts are 2.1 and 1.1%, respectively. The CHA zeolites in all samples came from the same parent zeolite material, and all samples have the same washcoat loading (1.6 g/in³). These samples were tested at 200° C. for $NH_3$ adsorption and desorption as well as SCR activity. FIG. 16 plots the $NO_x$ conversion at 20 ppm $NH_3$ slip vs. the $NH_3$ storage capacity up to that point at 200° C. Both $NO_x$ conversion and $NH_3$ storage capacity follow the overall CuO loading on the catalyst, regardless whether a sample was made by blending Cu-CHA/H-CHA or just Cu-CHA alone. Although not intending to be limited by theory, it appears that H-CHA plays a dilution role to the Cu-CHA catalyst.

TABLE 3

Catalyst composition for Samples 9 to 12

| Sample ID | Zeolite | Overall CuO loading (weight %) |
|---|---|---|
| 1 | Cu-CHA (3.2% CuO) | 3.2 |
| 9 | Cu-CHA (2.5% CuO) | 2.5 |
| 10 | Cu-CHA (1.7% CuO) | 1.7 |
| 11 | Cu-CHA (3.2% CuO) + H-CHA; Cu-CHA/H-CHA = 2:1 | 2.1 |
| 12 | Cu-CHA (3.2% CuO) + H-CHA; Cu-CHA/H-CHA = 1:2 | 1.1 |

While the invention herein disclosed has been described by means of specific embodiments and applications thereof, numerous modifications and variations could be made thereto by those skilled in the art without departing from the scope of the disclosure set forth in the claims. Furthermore, various aspects of the disclosure may be used in other applications than those for which they were specifically described herein.

That which is claimed:

1. A catalytic article comprising a substrate having a plurality of channels for gas flow and a catalyst composition disposed on the substrate, wherein the catalyst composition comprises:
    a first zeolite with a first framework structure and a second zeolite with a second framework structure,
    wherein the first zeolite comprises a promoter metal with a promoter metal content in an amount from about 0.1 to about 50 % by weight based on a total weight of the catalyst composition;
    wherein the first and second framework structures are different and the first or the second framework structure is selected from a small pore framework structure,
    wherein the promoter metal is selected from Cu, Co, Ni, La, Mn, V, Ag, Ce, Nd, Mo, Hf, Y, W and combinations thereof,
    wherein the second zeolite is substantially free of transition metal and is in H' form, wherein the catalyst composition has a total loading of the first zeolite on the substrate from about 0.1 to about 6 g/in$^3$, and
    wherein the catalyst composition has total loading of the second zeolite on the substrate from about 0.05 to about 1 g/in$^3$.

2. The catalytic article of claim 1, wherein the promoter metal is copper (Cu).

3. The catalytic article of claim 1, wherein the second zeolite is present in an amount of from about 0.1% to about 50% by weight based on total weight of the catalyst composition.

4. The catalytic article of claim 1, wherein the first and second zeolites are independently selected from aluminosilicate, borosilicate, gallosilicate, SAPO, AlPO, MeAPSO, and MeAPO zeolites.

5. The catalytic article of claim 1, wherein the first and second framework structures are independently selected from AEI, AFT, AFV, AFX, AVL, BEA, CHA, DDR, EAB, EEI, ERI, FAU, FER, IFY, IRN, KFI, LEV, LTA, LTN, MER, MOR, MWF, MFI, NPT, PAU, RHO, RTE, RTH, SAS, SAT, SAV, SFW, TSC, and UFI.

6. The catalytic article of claim 1, wherein the substrate is a wall flow filter or a flow through substrate.

7. A method for reducing NOx level in an exhaust gas, comprising contacting the exhaust gas with the catalytic article of claim 1 for a time and at a temperature sufficient to reduce the level of NOx in the exhaust gas.

8. The method of claim 7, wherein the level of NOx in the exhaust gas is reduced by at least 40%.

9. The method of claim 7, wherein the temperature ranges from about 150° C. to about 350° C.

10. The method of claim 7, wherein the temperature ranges from about 450°° C. to about 750° C.

11. An emission treatment system for treating an exhaust gas stream, the emission treatment system comprising:
    an engine producing an exhaust gas stream; and
    the catalytic article of claim 1 positioned downstream from the engine in fluid communication with the exhaust gas stream.

12. The emission treatment system of claim 11, further comprising one or more of a diesel oxidation catalyst (DOC), a catalyzed soot filter (CSF), a soot filter, a selective catalytic reduction (SCR) catalyst, a SCR catalyst coated onto a filter (SCROF), an ammonia oxidation (AMOx) catalyst, a SCR/AMOx catalyst, a lean NOx trap (LNT), and a nitrogenous reductant injector.

13. The emission treatment system of claim 12, wherein:
    (a) the catalyst composition is located downstream of the DOC and upstream of the soot filter; or
    (b) the catalyst composition is located downstream of the DOC and the soot filter; or
    (c) the catalyst composition is located upstream of the DOC and the soot filter; or
    (d) the catalyst composition is located downstream of the LNT; or
    (e) the catalyst composition is on the soot filter; or
    (f) the catalyst composition is on the SCR catalyst or the SCR/AMOx catalyst.

* * * * *